US011492952B2

(12) United States Patent
Furui et al.

(10) Patent No.: US 11,492,952 B2
(45) Date of Patent: Nov. 8, 2022

(54) CATALYST DEGRADATION DETECTION APPARATUS

(71) Applicant: TOYOTA JIDOSHA KABUSHIKI KAISHA, Toyota (JP)

(72) Inventors: Kenji Furui, Sunto-gun (JP); Go Hayashita, Chigasaki (JP); Yoichi Kadota, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 49 days.

(21) Appl. No.: 17/116,058

(22) Filed: Dec. 9, 2020

(65) Prior Publication Data
US 2021/0199041 A1 Jul. 1, 2021

(30) Foreign Application Priority Data
Dec. 25, 2019 (JP) .............................. JP2019-234706

(51) Int. Cl.
| | | |
|---|---|---|
| F01N 11/00 | (2006.01) | |
| F02D 41/02 | (2006.01) | |
| F02D 41/24 | (2006.01) | |

(52) U.S. Cl.
CPC ........ *F01N 11/007* (2013.01); *F02D 41/0295* (2013.01); *F02D 41/2454* (2013.01); *F01N 2560/14* (2013.01); *F01N 2900/0416* (2013.01); *F01N 2900/1624* (2013.01); *F02D 2200/0814* (2013.01); *F02D 2200/0816* (2013.01)

(58) Field of Classification Search
CPC combination set(s) only.
See application file for complete search history.

(56) References Cited

U.S. PATENT DOCUMENTS

| | | | |
|---|---|---|---|
| 5,127,225 A | 7/1992 | Nada | |
| 5,684,248 A | 11/1997 | Iwata | |
| 2004/0055278 A1* | 3/2004 | Miyoshi | .............. F02D 41/0295 60/272 |
| 2004/0182068 A1* | 9/2004 | Sun | ..................... F02D 41/0295 60/276 |

(Continued)

FOREIGN PATENT DOCUMENTS

| | | |
|---|---|---|
| CN | 101636568 A | 1/2010 |
| JP | H 04-086345 A | 3/1992 |

(Continued)

*Primary Examiner* — Binh Q Tran
(74) *Attorney, Agent, or Firm* — Finnegan, Henderson, Farabow, Garrett & Dunner, LLP

(57) ABSTRACT

A catalyst degradation detection apparatus includes an air-fuel ratio detector disposed downstream of a catalyst and configured to detect an air-fuel ratio of exhaust gas flowing out from the catalyst, and an electronic control unit configured to control an air-fuel ratio of inflow exhaust gas flowing into the catalyst and determine whether the catalyst is degraded. The electronic control unit is configured to execute degradation determination control that brings the air-fuel ratio of the inflow exhaust gas to an air-fuel ratio leaner or richer than a stoichiometric air-fuel ratio. The electronic control unit is configured to determine whether precious metal of the catalyst is degraded based on the air-fuel ratio detected by the air-fuel ratio detector when an oxygen storage amount of the catalyst is varying in the degradation determination control.

21 Claims, 17 Drawing Sheets

(56) References Cited

U.S. PATENT DOCUMENTS

| | | | |
|---|---|---|---|
| 2007/0051094 A1* | 3/2007 | Tanada | F01N 3/0864 |
| | | | 60/297 |
| 2008/0173008 A1* | 7/2008 | Kidokoro | F01N 11/002 |
| | | | 60/276 |
| 2010/0077729 A1 | 4/2010 | Endo | |
| 2010/0242934 A1* | 9/2010 | Yonekawa | F02D 41/1475 |
| | | | 123/703 |
| 2013/0036808 A1* | 2/2013 | Kitaura | F01N 11/007 |
| | | | 73/114.75 |
| 2014/0250993 A1 | 9/2014 | Aoki et al. | |
| 2015/0086428 A1 | 3/2015 | Kitaura et al. | |
| 2015/0240733 A1* | 8/2015 | Inoue | F01N 9/002 |
| | | | 60/285 |

FOREIGN PATENT DOCUMENTS

| | | |
|---|---|---|
| JP | 3284844 B2 | 5/2002 |
| JP | 2012-197676 A | 10/2012 |
| JP | 2015-086861 A | 5/2015 |
| JP | 5871009 B2 | 3/2016 |

* cited by examiner

FIG. 1
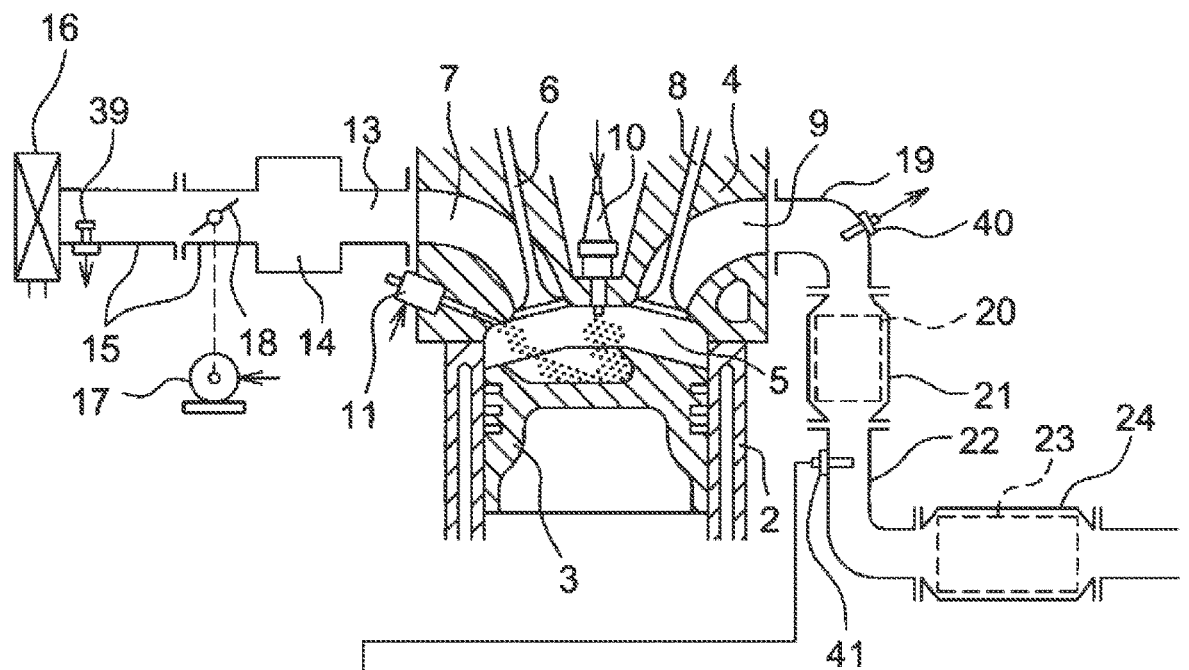
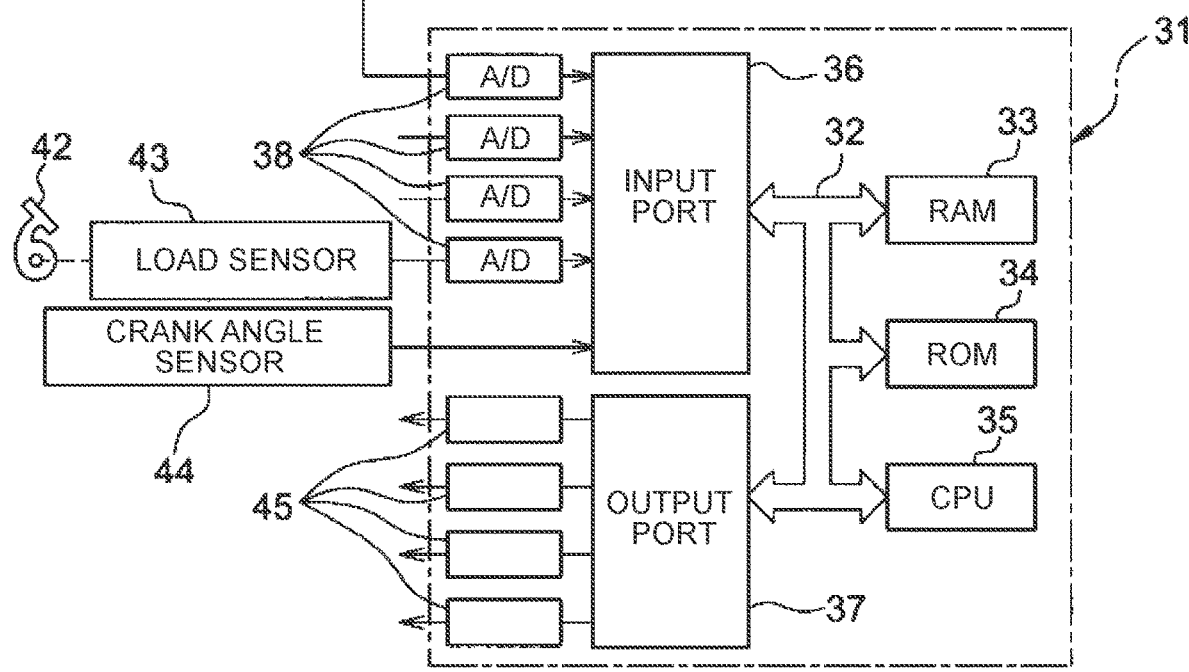

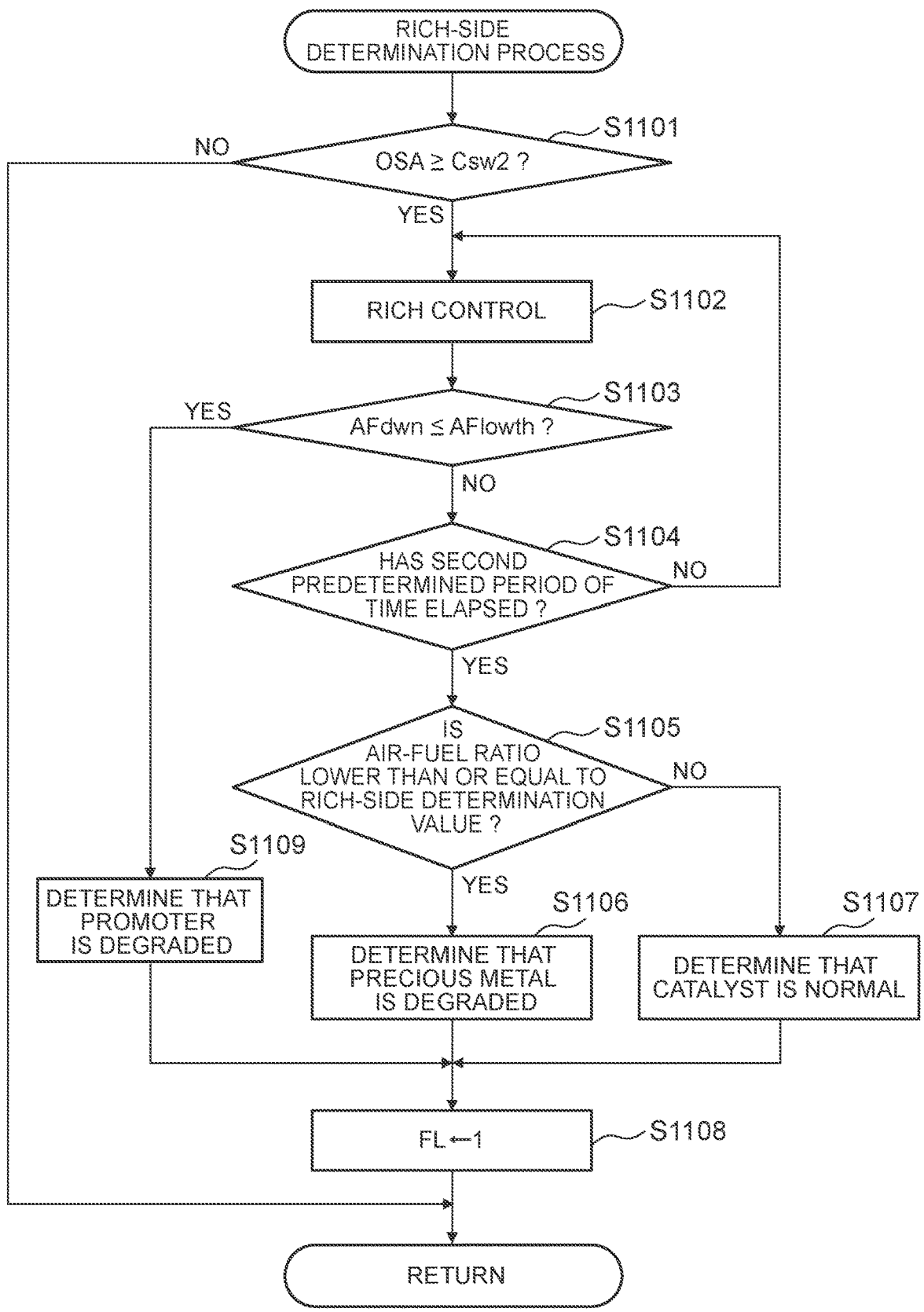

CATALYST DEGRADATION DETECTION APPARATUS

CROSS-REFERENCE TO RELATED APPLICATION

This application claims priority to Japanese Patent Application No. 2019-234706 filed on Dec. 25, 2019, incorporated herein by reference in its entirety.

BACKGROUND

1. Technical Field

The disclosure relates to a catalyst degradation detection apparatus.

2. Description of Related Art

A catalyst for controlling exhaust gas emitted from an internal combustion engine is provided in an exhaust passage of the internal combustion engine. A catalyst that is capable of storing oxygen maintains catalytic atmosphere near a stoichiometric air-fuel ratio by absorbing or releasing oxygen. Thus, a decrease in removal performance when the air-fuel ratio of exhaust gas deviates from the stoichiometric air-fuel ratio is suppressed.

A catalyst degrades as a result of long-term use or the like. It is known that the oxygen storage capability of a catalyst decreases as a typical degradation mode of a catalyst. As the oxygen storage capability of a catalyst decreases, the removal performance of the catalyst decreases when the air-fuel ratio of exhaust gas fluctuates. For this reason, in order to reduce deterioration of exhaust emissions due to degradation of a catalyst, it is desirable to be able to detect degradation of a catalyst.

An abnormality diagnosis apparatus for an internal combustion engine, described in Japanese Unexamined Patent Application Publication No. 2015-086861 (JP 2015-086861 A), calculates the maximum oxygen storage amount of a catalyst and determines the degree of degradation of the catalyst based on the calculated maximum oxygen storage amount. Specifically, when the maximum oxygen storage amount indicating the oxygen storage capability of the catalyst is less than a lower limit storage amount, the abnormality diagnosis apparatus determines that the catalyst is degraded.

In recent years, development of a catalyst capable of suppressing a decrease in the oxygen storage capability of the catalyst by reducing degradation of a promoter of the catalyst in an actual use environment has been proceeding. With such a catalyst, a degradation mode in which precious metal of the catalyst degrades in a state where the oxygen storage capability of the catalyst is maintained may occur. In the above-described degradation determination based on the maximum oxygen storage amount, it is difficult to detect degradation of precious metal of a catalyst.

In contrast, a catalyst degradation determination apparatus described in Japanese Unexamined Patent Application Publication No. 2012-197676 (JP 2012-197676 A), after the oxygen storage amount of a catalyst reaches zero, maintains the air-fuel ratio of exhaust gas flowing into the catalyst at an air-fuel ratio richer than the stoichiometric air-fuel ratio and determines whether precious metal of the catalyst is degraded based on the concentration of oxygen in exhaust gas flowing out from the catalyst at this time.

SUMMARY

With a degradation determination method described in JP 2012-197676 A, exhaust gas richer than the stoichiometric air-fuel ratio continuously flows into the catalyst even after the oxygen storage amount of the catalyst reaches zero. For this reason, regardless of whether the catalyst is degraded, large amounts of HC and CO flow out from the catalyst, so exhaust emissions may deteriorate.

The disclosure provides a catalyst degradation detection apparatus, which is capable of detecting degradation of precious metal of a catalyst while reducing deterioration of exhaust emissions.

An aspect of the disclosure relates to a catalyst degradation detection apparatus. The catalyst degradation detection apparatus is configured to detect degradation of a catalyst disposed in an exhaust passage of an internal combustion engine and capable of storing oxygen. The catalyst degradation detection apparatus includes an air-fuel ratio detector and an electronic control unit. The air-fuel ratio detector is disposed downstream of the catalyst and is configured to detect an air-fuel ratio of exhaust gas flowing out from the catalyst. The electronic control unit is configured to control an air-fuel ratio of inflow exhaust gas flowing into the catalyst and determine whether the catalyst is degraded. The electronic control unit is configured to execute degradation determination control that brings the air-fuel ratio of the inflow exhaust gas to an air-fuel ratio leaner or richer than a stoichiometric air-fuel ratio. The electronic control unit is configured to determine whether precious metal of the catalyst is degraded based on the air-fuel ratio detected by the air-fuel ratio detector when an oxygen storage amount of the catalyst is varying in the degradation determination control.

In the catalyst degradation detection apparatus, the electronic control unit may be configured to execute lean control that brings the air-fuel ratio of the inflow exhaust gas to an air-fuel ratio leaner than the stoichiometric air-fuel ratio as the degradation determination control. The electronic control unit may be configured to, when the air-fuel ratio detected by the air-fuel ratio detector, an average of the air-fuel ratio, a variation in the air-fuel ratio, or a slope of the air-fuel ratio while the oxygen storage amount of the catalyst is increasing in the lean control is greater than or equal to a lean-side determination value, determine that the precious metal of the catalyst is degraded.

In the catalyst degradation detection apparatus, the electronic control unit may be configured to execute rich control that brings the air-fuel ratio of the inflow exhaust gas to an air-fuel ratio richer than the stoichiometric air-fuel ratio as the degradation determination control. The electronic control unit may be configured to, when the air-fuel ratio detected by the air-fuel ratio detector, an average of the air-fuel ratio, a variation in the air-fuel ratio, or a slope of the air-fuel ratio while the oxygen storage amount of the catalyst is reducing in the rich control is less than or equal to a rich-side determination value, determine that the precious metal of the catalyst is degraded.

In the catalyst degradation detection apparatus, the electronic control unit may be configured to execute lean control that brings the air-fuel ratio of the inflow exhaust gas to an air-fuel ratio leaner than the stoichiometric air-fuel ratio and rich control that brings the air-fuel ratio of the inflow exhaust gas to an air-fuel ratio richer than the stoichiometric air-fuel ratio as the degradation determination control. The electronic control unit may be configured to, when the air-fuel ratio detected by the air-fuel ratio detector, an average of the air-fuel ratio, a variation in the air-fuel ratio, or a slope of the air-fuel ratio while the oxygen storage amount of the catalyst is increasing in the lean control is greater than or equal to a lean-side determination value, determine that the precious metal of the catalyst is degraded. The electronic control unit may be configured to, when the air-fuel ratio detected by the air-fuel ratio detector, an average of the air-fuel ratio, a variation in the air-fuel ratio, or a slope of the air-fuel ratio while the oxygen storage amount of the catalyst is reducing in the rich control is less than or equal to a rich-side determination value, determine that the precious metal of the catalyst is degraded.

In the catalyst degradation detection apparatus, the electronic control unit may be configured to successively execute the lean control and the rich control.

In the catalyst degradation detection apparatus, the electronic control unit may be configured to, when a difference between the air-fuel ratio detected by the air-fuel ratio detector and the stoichiometric air-fuel ratio reaches an upper limit in the degradation determination control, not determine whether the precious metal of the catalyst is degraded.

In the catalyst degradation detection apparatus, the electronic control unit may be configured to start the lean control when the air-fuel ratio detected by the air-fuel ratio detector is lower than or equal to a rich determination air-fuel ratio richer than the stoichiometric air-fuel ratio.

In the catalyst degradation detection apparatus, the electronic control unit may be configured to calculate the oxygen storage amount of the catalyst. The electronic control unit may be configured to execute the lean control such that the calculated oxygen storage amount does not reach a predetermined maximum oxygen storage amount.

In the catalyst degradation detection apparatus, the electronic control unit may be configured to, when the air-fuel ratio detected by the air-fuel ratio detector reaches an upper limit air-fuel ratio leaner than the stoichiometric air-fuel ratio in the lean control, determine that a promoter of the catalyst is degraded.

In the catalyst degradation detection apparatus, the electronic control unit may be configured to start the rich control when the air-fuel ratio detected by the air-fuel ratio detector is higher than or equal to a lean determination air-fuel ratio leaner than the stoichiometric air-fuel ratio.

In the catalyst degradation detection apparatus, the electronic control unit may be configured to calculate the oxygen storage amount of the catalyst. The electronic control unit may be configured to execute the rich control such that the calculated oxygen storage amount does not reach zero.

In the catalyst degradation detection apparatus, the electronic control unit may be configured to, when the air-fuel ratio detected by the air-fuel ratio detector reaches a lower limit air-fuel ratio richer than the stoichiometric air-fuel ratio in the rich control, determine that a promoter of the catalyst is degraded.

According to the disclosure, a catalyst degradation detection apparatus, which is capable of detecting degradation of precious metal of a catalyst while reducing deterioration of exhaust emissions are provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram that schematically shows an internal combustion engine provided with a catalyst degradation detection apparatus according to a first embodiment of the disclosure;

FIG. 17 is a flowchart that shows a control routine of a rich-side determination process in the fourth embodiment of the disclosure.

DETAILED DESCRIPTION OF EMBODIMENTS

Figure 2:
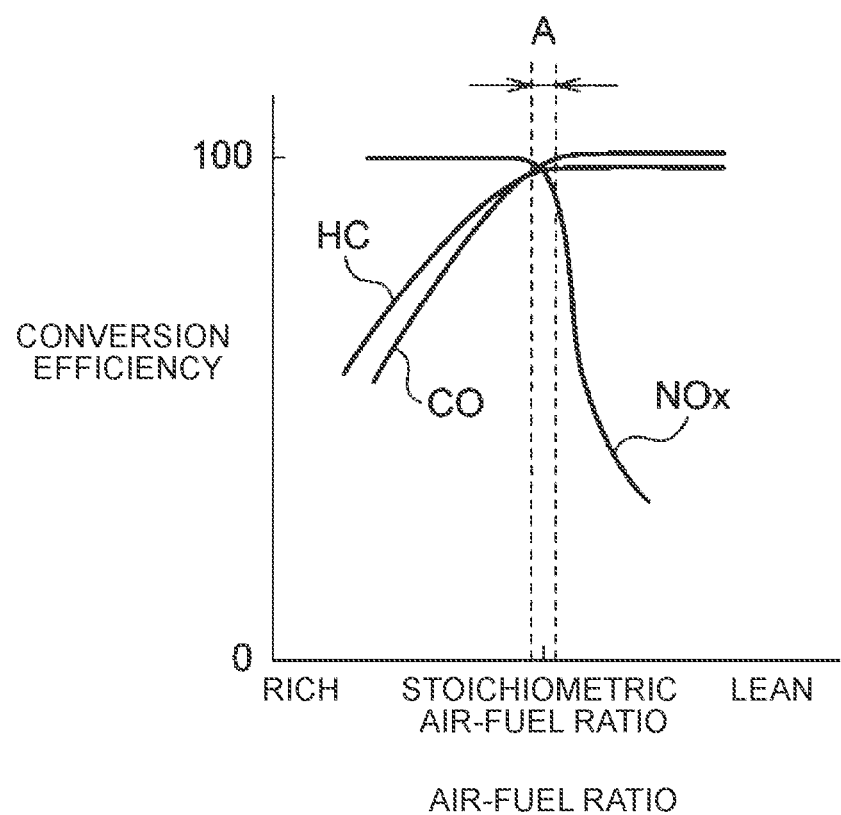
FIG. 2 shows the characteristics of a three-way catalyst for reducing emissions.

Hereinafter, embodiments of the disclosure will be described in detail with reference to the accompanying drawings. In the following description, like reference numerals denote similar components.

First Embodiment

Initially, a first embodiment of the disclosure will be described with reference to FIG. 1 to FIG. 7.

Description of Overall Internal Combustion Engine

FIG. 1 is a diagram that schematically shows an internal combustion engine provided with a catalyst degradation detection apparatus according to the first embodiment of the disclosure. The internal combustion engine shown in FIG. 1 is a spark ignition internal combustion engine. The internal combustion engine is mounted on a vehicle.

As shown in FIG. 1, the reference numeral 2 indicates a cylinder block, the reference numeral 3 indicates pistons that reciprocate in the cylinder block 2, the reference numeral 4 indicates a cylinder head fixed to the top of the cylinder block 2, the reference numeral 5 indicates combustion chambers each defined between the piston 3 and the cylinder head 4, the reference numeral 6 indicates intake valves, the reference numeral 7 indicates intake ports, the reference numeral 8 indicates exhaust valves, and the reference numeral 9 indicates exhaust ports. The intake valves 6 each open or close an associated one of the intake ports 7. The exhaust valves 8 each open or close an associated one of the exhaust ports 9.

As shown in FIG. 1, ignition plugs 10 each are disposed in the center portion of the inner wall surface of the cylinder head 4, and fuel injection valves 11 each are disposed in the peripheral portion of the inner wall surface of the cylinder head 4. The ignition plug 10 is configured to generate spark in response to an ignition signal. The fuel injection valve 11 injects a predetermined amount of fuel into an associated one of the combustion chambers 5 in response to an injection signal. In the present embodiment, gasoline with a stoichiometric air-fuel ratio of 14.6 is used as a fuel.

The intake port 7 of each cylinder is coupled to a surge tank 14 via an associated intake branch pipe 13. The surge tank 14 is coupled to an air cleaner 16 via the intake pipe 15. The intake ports 7, the intake branch pipes 13, the surge tank 14, the intake pipe 15, and the like make up an intake passage that leads air to the combustion chambers 5. A throttle valve 18 is disposed in the intake pipe 15. The throttle valve 18 is driven by a throttle valve actuator 17. The throttle valve 18 changes the opening area of the intake passage by being turned by the throttle valve actuator 17.

On the other hand, the exhaust port 9 of each cylinder is coupled to an exhaust manifold 19. The exhaust manifold 19 includes multiple branch portions respectively coupled to the exhaust ports 9, and a collective portion into which the branch portions are collected. The collective portion of the exhaust manifold 19 is coupled to an upstream casing 21 accommodating an upstream catalyst 20. The upstream casing 21 is coupled to a downstream casing 24 via an exhaust pipe 22. The downstream casing 24 accommodates a downstream catalyst 23. The exhaust ports 9, the exhaust manifold 19, the upstream casing 21, the exhaust pipe 22, the downstream casing 24, and the like make up an exhaust passage through which exhaust gas produced as a result of combustion of air-fuel mixture in the combustion chambers 5 is emitted.

Various controls over the internal combustion engine are executed by an electronic control unit (ECU) 31. In other words, the ECU 31 functions as a controller for the internal combustion engine. Signals from various sensors provided in the internal combustion engine are input to the ECU 31. The ECU 31 controls various actuators of the internal combustion engine based on the signals from various sensors, and the like.

The ECU 31 is made up of a digital computer and includes random access memory (RAM) 33, read-only memory (ROM) 34, a microprocessor (CPU) 35, an input port 36, and an output port 37 connected to one another via a bidirectional bus 32. In the present embodiment, the single ECU 31 is provided. Alternatively, multiple ECUs may be provided function by function.

An air flow meter 39 is disposed in the intake pipe 15. The air flow meter 39 detects the flow rate of air that flows through the intake pipe 15. A signal output from the air flow meter 39 is input to the input port 36 via an associated one of analog-to-digital converters 38.

An upstream air-fuel ratio sensor 40 is disposed at the collective portion of the exhaust manifold 19, that is, upstream of the upstream catalyst 20 in an exhaust gas flow direction. The upstream air-fuel ratio sensor 40 detects the air-fuel ratio of exhaust gas flowing through the exhaust manifold 19 (that is, exhaust gas flowing into the upstream catalyst 20). A signal (current) output from the upstream air-fuel ratio sensor 40 increases in proportion to the air-fuel ratio of exhaust gas. The upstream air-fuel ratio sensor 40 is capable of continuously (linearly) detecting the air-fuel ratio of exhaust gas. A signal output from the upstream air-fuel ratio sensor 40 is input to the input port 36 via an associated one of the analog-to-digital converters 38.

A downstream air-fuel ratio sensor 41 is disposed in the exhaust pipe 22, that is, downstream of the upstream catalyst 20 in the exhaust gas flow direction. The downstream air-fuel ratio sensor 41 detects the air-fuel ratio of exhaust gas flowing through the exhaust pipe 22 (that is, exhaust gas flowing out from the upstream catalyst 20). A signal (current) output from the downstream air-fuel ratio sensor 41 increases in proportion to the air-fuel ratio of exhaust gas. The downstream air-fuel ratio sensor 41 is capable of continuously (linearly) detecting the air-fuel ratio of exhaust gas. A signal output from the downstream air-fuel ratio sensor 41 is input to the input port 36 via an associated one of the analog-to-digital converters 38.

A load sensor 43 is connected to an accelerator pedal 42 provided in the vehicle on which the internal combustion engine is mounted. The load sensor 43 generates an output voltage proportional to the depression amount of the accelerator pedal 42. A voltage output from the load sensor 43 is input to the input port 36 via an associated one of the analog-to-digital converters 38. The ECU 31 calculates an engine load based on a signal output from the load sensor 43.

A crank angle sensor 44 is connected to the input port 36. The crank angle sensor 44 generates an output pulse each time a crankshaft rotates a predetermined angle (for example, 10°). The output pulse is input to the input port 36. The ECU 31 calculates an engine rotation speed based on a signal output from the crank angle sensor 44.

On the other hand, the output port 37 is connected to various actuators of the internal combustion engine via associated driver circuits 45. In the present embodiment, the output port 37 is connected to the ignition plugs 10, the fuel injection valves 11, and the throttle valve actuator 17, and the ECU 31 controls the ignition plugs 10, the fuel injection valves 11, and the throttle valve actuator 17. Specifically, the ECU 31 controls the ignition timing of each ignition plug 10, the injection timing and injection amount of each fuel injection valve 11, and the opening degree of the throttle valve 18.

The above-described internal combustion engine is a non-supercharged internal combustion engine using gasoline as a fuel; however, the configuration of the internal combustion engine is not limited to the above-described configuration. Therefore, a specific configuration of the internal combustion engine, such as cylinder arrangement, fuel injection mode, intake and exhaust system configuration, valve actuator configuration, and the presence or absence of a supercharger, may be different from the configuration shown in FIG. 1. For example, each fuel injection valve 11 may be disposed so as to inject fuel into an associated one of the intake ports 7.

Description of Catalyst

The upstream catalyst 20 and the downstream catalyst 23, disposed in the exhaust passage, have similar configurations. For this reason, hereinafter, the upstream catalyst 20 (hereinafter, simply referred to as catalyst 20) will be described. The catalyst 20 is a three-way catalyst that is capable of storing oxygen and capable of removing, for example, hydrocarbons (HC), carbon monoxide (CO), and nitrogen oxides (NOx) at the same time. The catalyst 20 includes a base material (carrier) made of ceramics, metal, or the like, precious metal (for example, platinum (Pt), palladium (PD), and rhodium (Rh), or the like) having a catalysis, and a promoter (for example, ceria ($CeO_2$) or the like) having an oxygen storage capability. The precious metal and the promoter are supported on the base material.

FIG. 2 shows the characteristics of the three-way catalyst for reducing emissions. As shown in FIG. 2, the conversion efficiencies of HC, CO, and NOx by the catalyst 20 are very high when the air-fuel ratio of exhaust gas flowing into the catalyst 20 falls in a range near the stoichiometric air-fuel ratio (the conversion window A in FIG. 2). Therefore, when the air-fuel ratio of exhaust gas is maintained at the stoichiometric air-fuel ratio, the catalyst 20 is capable of effectively removing HC, CO, and NOx.

The catalyst 20 stores or releases oxygen by using the promoter in accordance with the air-fuel ratio of exhaust gas. Specifically, when the air-fuel ratio of exhaust gas is leaner than the stoichiometric air-fuel ratio, the catalyst 20 stores excess oxygen in exhaust gas. On the other hand, when the air-fuel ratio of exhaust gas is richer than the stoichiometric air-fuel ratio, the catalyst 20 releases oxygen to make up for a shortage to oxidize HC and CO. As a result, even when the air-fuel ratio of exhaust gas slightly deviates from the stoichiometric air-fuel ratio, the air-fuel ratio on the surface of the catalyst 20 is maintained near the stoichiometric air-fuel ratio, and HC, CO, and NOx are effectively removed in the catalyst 20.

Generally, when a catalyst is exposed to a high-temperature environment caused by exhaust gas, degradation of the catalyst takes place. Degradation of a catalyst includes degradation of precious metal of the catalyst and degradation of a promoter of the catalyst. Degradation of precious metal occurs because of agglomeration of precious metal, or the like and reduces active sites of the catalyst. When degradation of precious metal (such as Pt and Pd) that mainly functions as oxidation active sites occurs, the oxidation capability of the catalyst decreases. When degradation of precious metal (such as Rh) that mainly functions as reduction active sites occurs, the reduction capability of the catalyst decreases. Degradation of a promoter occurs because of agglomeration of the promoter, or the like. When degradation of a promoter occurs, the oxygen storage capability of the catalyst decreases, and a maximum oxygen storage amount by which the catalyst is capable of storing oxygen decreases.

In the present embodiment, the catalyst 20 is configured such that the heat resistance of the promoter is higher than the heat resistance of the precious metal in a service environment. The catalyst 20 is, for example, a so-called base material catalyst of which the base material and the promoter are fired in the manufacturing process. In the base material catalyst, the promoter is exposed to high temperatures to agglomerate in the manufacturing process. For this reason, in an actual service environment, the progress of agglomeration of the promoter is suppressed, and, by extension, a decrease in the oxygen storage capability of the catalyst is suppressed. In the base material catalyst, the oxygen storage capability of a new catalyst is ensured by, for example, increasing the amount of promoter or using a material having a high heat resistance as a promoter.

Catalyst Degradation Detection Apparatus

When the catalyst 20 degrades, the removal performance of the catalyst 20 decreases, and exhaust emissions deteriorate. For this reason, in the present embodiment, the catalyst degradation detection apparatus that detects degradation of the catalyst 20 is provided in the internal combustion engine.

Figure 3:
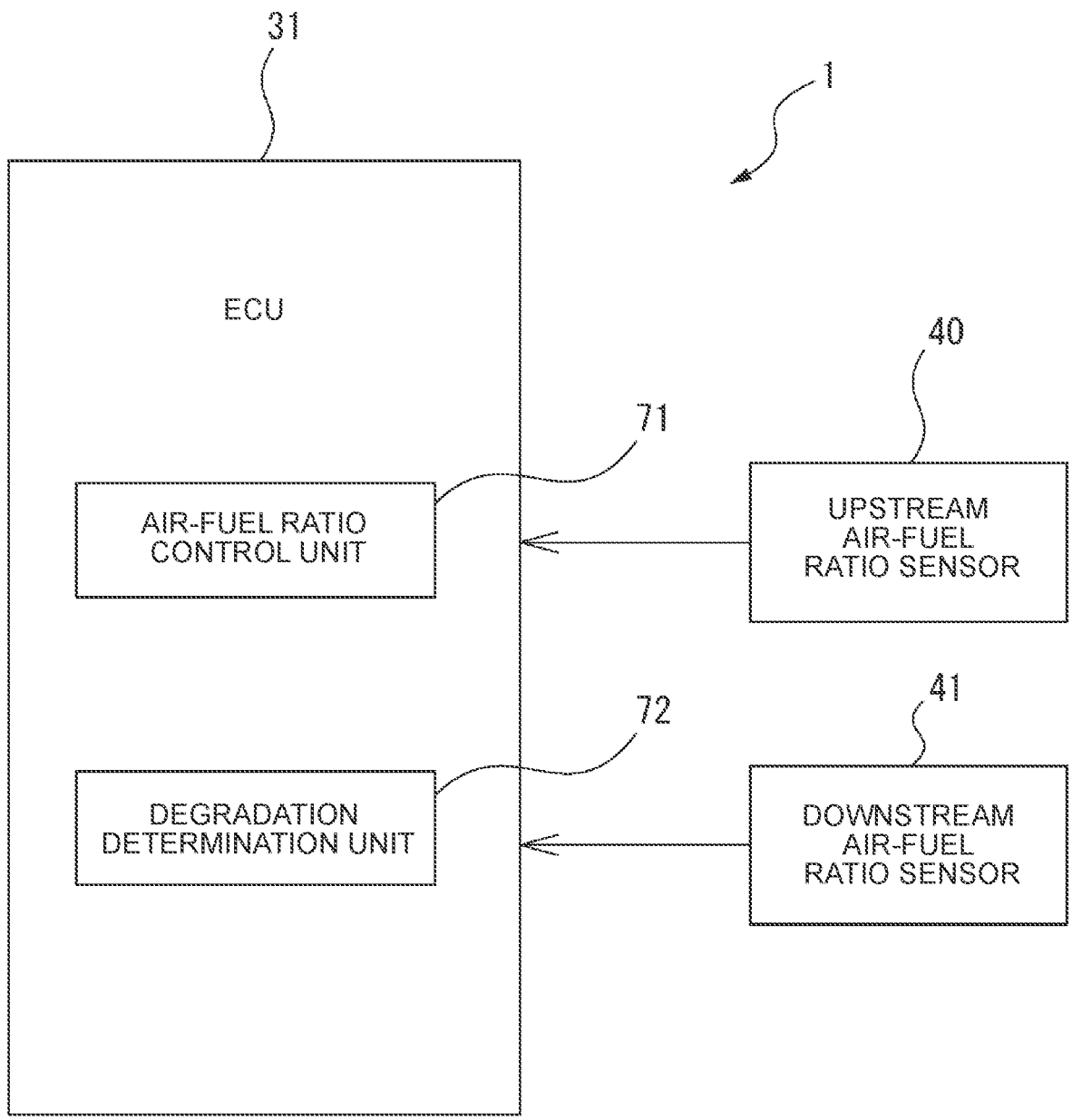
FIG. 3 is a block diagram that schematically shows the configuration of the catalyst degradation detection apparatus according to the first embodiment of the disclosure.

FIG. 3 is a block diagram that schematically shows the configuration of the catalyst degradation detection apparatus 1 according to the first embodiment of the disclosure. The catalyst degradation detection apparatus 1 includes the upstream air-fuel ratio sensor 40, the downstream air-fuel ratio sensor 41, an air-fuel ratio control unit 71, and a degradation determination unit 72. The downstream air-fuel ratio sensor 41 is an example of the air-fuel ratio detector. In the present embodiment, the ECU 31 functions as the air-fuel ratio control unit 71 and the degradation determination unit 72.

The air-fuel ratio control unit 71 controls the air-fuel ratio of exhaust gas flowing into the catalyst 20 (hereinafter, referred to as inflow exhaust gas). Specifically, the air-fuel ratio control unit 71 sets a target air-fuel ratio of inflow exhaust gas and controls the fuel injection amount of each fuel injection valve 11 such that the air-fuel ratio of inflow exhaust gas coincides with the target air-fuel ratio. For example, the air-fuel ratio control unit 71 executes feedback control over the fuel injection amount of each fuel injection valve 11 such that the output air-fuel ratio of the upstream air-fuel ratio sensor 40 coincides with the target air-fuel ratio. An output air-fuel ratio of an air-fuel ratio sensor means an air-fuel ratio corresponding to an output value of the air-fuel ratio sensor, that is, an air-fuel ratio detected by the air-fuel ratio sensor.

The air-fuel ratio control unit 71 may control the fuel injection amount of each fuel injection valve 11 without using the upstream air-fuel ratio sensor 40 such that the air-fuel ratio of inflow exhaust gas coincides with the target air-fuel ratio. In this case, the air-fuel ratio control unit 71 causes the fuel injection valves 11 to supply the combustion chambers 5 with the amount of fuel calculated from the intake air volume detected by the air flow meter 39 and the target air-fuel ratio such that the ratio of air to the fuel injection amount of each fuel injection valve 11 coincides with the target air-fuel ratio. Therefore, the upstream air-fuel ratio sensor 40 may be omitted from the catalyst degradation detection apparatus.

Figure 4:
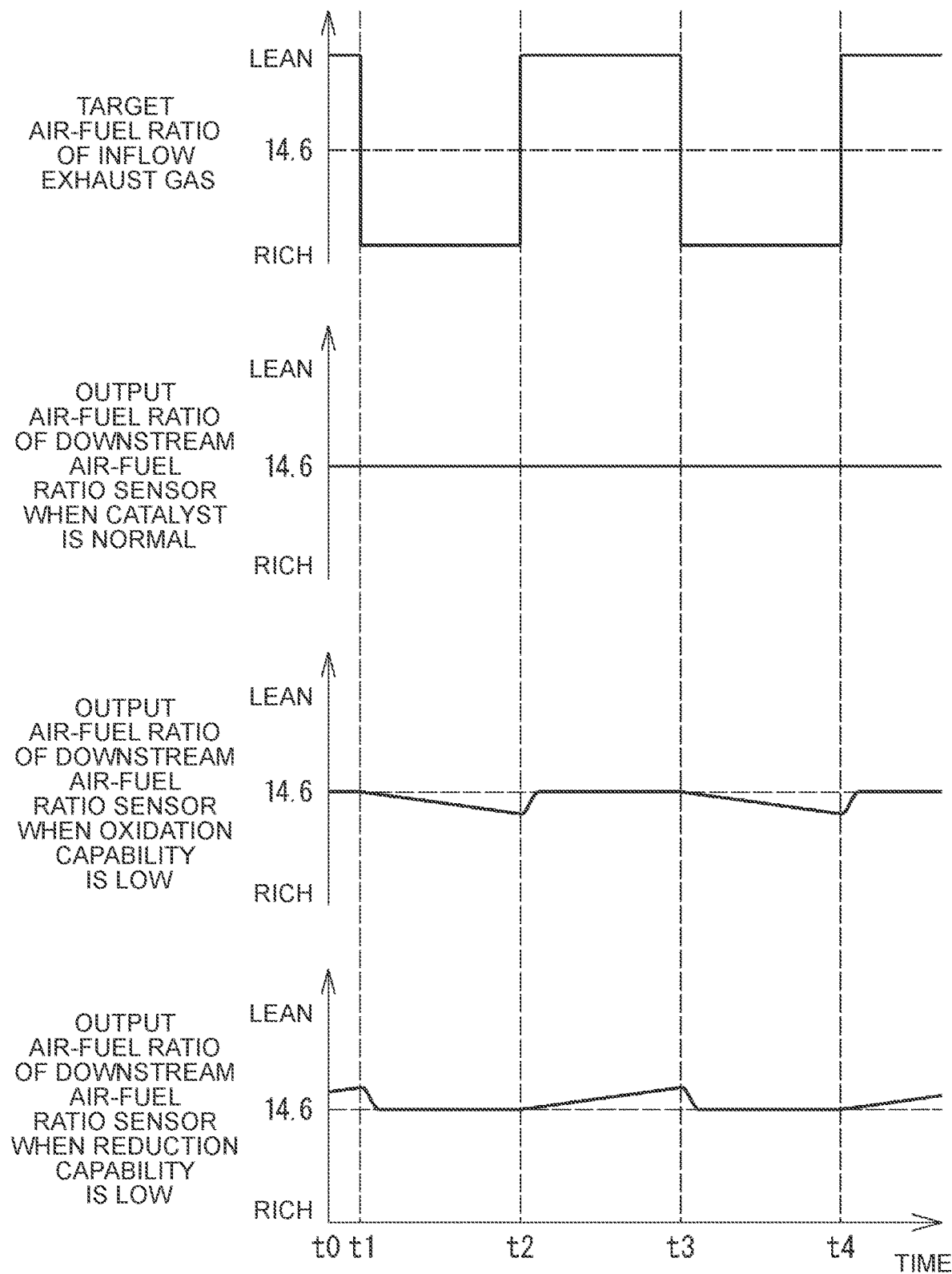
FIG. 4 is a timing chart of an output air-fuel ratio of a downstream air-fuel ratio sensor when the air-fuel ratio of inflow exhaust gas is varied.

FIG. 4 is a timing chart of an output air-fuel ratio of the downstream air-fuel ratio sensor 41 when the air-fuel ratio of inflow exhaust gas is varied. FIG. 4 shows three examples for the degraded states of the catalyst 20 as the output air-fuel ratio of the downstream air-fuel ratio sensor 41.

In the example of FIG. 4, the target air-fuel ratio of inflow exhaust gas is alternated between an air-fuel ratio richer than the stoichiometric air-fuel ratio and an air-fuel ratio leaner than the stoichiometric air-fuel ratio. Initially, the case where the catalyst 20 is normal, that is, the case where the catalyst 20 is not degraded, will be described with reference to the second graph from the top in FIG. 4.

At time t0, the target air-fuel ratio of inflow exhaust gas is set to a lean set air-fuel ratio leaner than the stoichiometric air-fuel ratio. At this time, the oxygen storage amount of the catalyst 20 is an appropriate value, and the atmosphere of the catalyst 20 is brought close to the stoichiometric air-fuel ratio by storing oxygen. As a result, NOx in exhaust gas is reduced in the catalyst 20, and the output air-fuel ratio of the downstream air-fuel ratio sensor 41 is maintained at the stoichiometric air-fuel ratio (14.6).

After that, at time t1, the target air-fuel ratio of inflow exhaust gas is switched from the lean set air-fuel ratio to a rich set air-fuel ratio richer than the stoichiometric air-fuel ratio. At this time, the oxygen storage amount of the catalyst 20 has not reached the maximum oxygen storage amount, so the output air-fuel ratio of the downstream air-fuel ratio sensor 41 is still maintained at the stoichiometric air-fuel ratio.

When the target air-fuel ratio of inflow exhaust gas is switched from the lean set air-fuel ratio to the rich set air-fuel ratio, the catalyst 20 releases oxygen to make up for a shortage to oxidize HC and CO. As a result, the atmosphere of the catalyst 20 is brought close to the stoichiometric air-fuel ratio, and HC and CO in exhaust gas are removed in the catalyst 20. Therefore, after time t1 as well, the output air-fuel ratio of the downstream air-fuel ratio sensor 41 is maintained at the stoichiometric air-fuel ratio.

After time t1, the target air-fuel ratio of inflow exhaust gas is maintained at the rich set air-fuel ratio, and the oxygen storage amount of the catalyst 20 gradually reduces. After that, at time t2, the target air-fuel ratio of inflow exhaust gas is switched from the rich set air-fuel ratio to the lean set air-fuel ratio. At this time, the oxygen storage amount of the catalyst 20 has not reached zero, so the output air-fuel ratio of the downstream air-fuel ratio sensor 41 is still maintained at the stoichiometric air-fuel ratio.

After time t2, the target air-fuel ratio of inflow exhaust gas is maintained at the lean set air-fuel ratio, and the oxygen storage amount of the catalyst 20 gradually increases. After that, at time t3, the target air-fuel ratio of inflow exhaust gas is switched from the lean set air-fuel ratio to the rich set air-fuel ratio. At this time, the oxygen storage amount of the catalyst 20 has not reached the maximum oxygen storage amount, so the output air-fuel ratio of the downstream air-fuel ratio sensor 41 is still maintained at the stoichiometric air-fuel ratio. After time t3, the target air-fuel ratio of inflow exhaust gas is maintained at the rich set air-fuel ratio, and, at time t4, the target air-fuel ratio of inflow exhaust gas is switched from the rich set air-fuel ratio to the lean set air-fuel ratio.

Therefore, in the example of FIG. 4, the air-fuel ratio of inflow exhaust gas is controlled such that the oxygen storage amount of the catalyst 20 does not reach zero or the maximum oxygen storage amount, and, when the catalyst 20 is normal, the output air-fuel ratio of the downstream air-fuel ratio sensor 41 is maintained at the stoichiometric air-fuel ratio.

Next, the case where the oxygen storage capability of the catalyst 20 is maintained but the oxidation capability of the catalyst 20 is low because of degradation of the precious metal of the catalyst 20 will be described with reference to the second graph from the bottom of FIG. 4. Such a degradation mode occurs in the catalyst 20 configured such that the heat resistance of the promoter is higher than the heat resistance of the precious metal.

When the oxidation capability of the catalyst 20 decreases, removal performance for HC and CO in exhaust gas decreases. For this reason, even when the atmosphere of the catalyst 20 is brought close to the stoichiometric air-fuel ratio by releasing oxygen while the target air-fuel ratio of inflow exhaust gas is set to the rich set air-fuel ratio, small amounts of HC and CO flow out from the catalyst 20. As a result, after the target air-fuel ratio of inflow exhaust gas is switched from the lean set air-fuel ratio to the rich set air-fuel ratio at time t1, the output air-fuel ratio of the downstream air-fuel ratio sensor 41 gradually decreases from the stoichiometric air-fuel ratio, and the degree of richness of the output air-fuel ratio of the downstream air-fuel ratio sensor 41 gradually increases.

After that, when the target air-fuel ratio of inflow exhaust gas is switched from the rich set air-fuel ratio to the lean set air-fuel ratio at time t2, the atmosphere of the catalyst 20 is brought close to the stoichiometric air-fuel ratio, and NOx in exhaust gas is removed by the reduction capability of the catalyst 20. As a result, after time t2, the output air-fuel ratio of the downstream air-fuel ratio sensor 41 converges to the stoichiometric air-fuel ratio.

After that, the output air-fuel ratio of the downstream air-fuel ratio sensor 41 is maintained at the stoichiometric air-fuel ratio, and, at time t3, the target air-fuel ratio of inflow exhaust gas is switched from the lean set air-fuel ratio to the rich set air-fuel ratio. As a result, the output air-fuel ratio of the downstream air-fuel ratio sensor 41 gradually decreases from the stoichiometric air-fuel ratio, and the degree of richness of the output air-fuel ratio of the downstream air-fuel ratio sensor 41 gradually increases. After that, when the target air-fuel ratio of inflow exhaust gas is switched from the rich set air-fuel ratio to the lean set air-fuel ratio at time t4, the output air-fuel ratio of the downstream air-fuel ratio sensor 41 converges to the stoichiometric air-fuel ratio.

Lastly, the case where the oxygen storage capability of the catalyst 20 is maintained but the reduction capability of the catalyst 20 is low because of degradation of the precious metal of the catalyst 20 will be described with reference to the bottom graph in FIG. 4. Such a degradation mode occurs in the catalyst 20 configured such that the heat resistance of the promoter is higher than the heat resistance of the precious metal.

When the reduction capability of the catalyst 20 decreases, removal performance for NOx in exhaust gas decreases. For this reason, even when the atmosphere of the catalyst 20 is brought close to the stoichiometric air-fuel ratio by storing oxygen while the target air-fuel ratio of inflow exhaust gas is set to the lean set air-fuel ratio, a small amount of NOx flows out from the catalyst 20. As a result, when the target air-fuel ratio of inflow exhaust gas is set at the lean set air-fuel ratio at time to, the output air-fuel ratio of the downstream air-fuel ratio sensor 41 becomes a value leaner than the stoichiometric air-fuel ratio.

After time t0, when the target air-fuel ratio of inflow exhaust gas is switched from the lean set air-fuel ratio to the rich set air-fuel ratio at time t1, the atmosphere of the catalyst 20 is brought close to the stoichiometric air-fuel ratio, and HC and CO in exhaust gas are removed by the oxidation capability of the catalyst 20. As a result, after time t1, the output air-fuel ratio of the downstream air-fuel ratio sensor 41 converges to the stoichiometric air-fuel ratio.

After that, the output air-fuel ratio of the downstream air-fuel ratio sensor 41 is maintained at the stoichiometric air-fuel ratio, and, at time t2, the target air-fuel ratio of inflow exhaust gas is switched from the rich set air-fuel ratio to the lean set air-fuel ratio. As a result, the output air-fuel ratio of the downstream air-fuel ratio sensor 41 gradually increases from the stoichiometric air-fuel ratio, and the degree of leanness of the output air-fuel ratio of the downstream air-fuel ratio sensor 41 gradually increases. After that, when the target air-fuel ratio of inflow exhaust gas is switched from the lean set air-fuel ratio to the rich set air-fuel ratio at time t3, the output air-fuel ratio of the downstream air-fuel ratio sensor 41 converges to the stoichiometric air-fuel ratio.

After that, the output air-fuel ratio of the downstream air-fuel ratio sensor 41 is maintained at the stoichiometric air-fuel ratio, and, at time t4, the target air-fuel ratio of inflow exhaust gas is switched from the rich set air-fuel ratio to the lean set air-fuel ratio. As a result, the output air-fuel ratio of the downstream air-fuel ratio sensor 41 increases from the stoichiometric air-fuel ratio again.

As is apparent from the above description, there is a difference in air-fuel ratio that is detected by the downstream air-fuel ratio sensor 41 when the oxygen storage amount of the catalyst 20 is varying between the normal catalyst 20 and the catalyst 20 of which the precious metal is degraded. Specifically, in the normal catalyst 20, the output air-fuel ratio of the downstream air-fuel ratio sensor 41 is maintained at the stoichiometric air-fuel ratio; whereas, in the catalyst 20 of which the precious metal is degraded, the output air-fuel ratio of the downstream air-fuel ratio sensor 41 changes so as to leave away from the stoichiometric air-fuel ratio. Therefore, it is possible to detect degradation of the precious metal of the catalyst 20 based on the output air-fuel ratio of the downstream air-fuel ratio sensor 41 when the oxygen storage amount of the catalyst 20 is varying.

For this reason, to detect degradation of the precious metal of the catalyst 20, the air-fuel ratio control unit 71 executes degradation determination control that brings the air-fuel ratio of inflow exhaust gas to an air-fuel ratio leaner or richer than the stoichiometric air-fuel ratio. The degradation determination unit 72 determines whether the precious metal of the catalyst 20 is degraded based on the air-fuel ratio detected by the downstream air-fuel ratio sensor 41 when the oxygen storage amount of the catalyst 20 is varying in the degradation determination control.

As described above, in the normal catalyst 20, exhaust gas is effectively removed in the catalyst 20 when the oxygen storage amount of the catalyst 20 is varying, and exhaust emissions almost do not deteriorate. Even when the precious metal of the catalyst 20 is degraded, an amount of NOx or amounts of HC and CO flowing out when the oxygen storage amount of the catalyst 20 is varying are small. For this reason, the catalyst degradation detection apparatus 1 is capable of detecting degradation of the precious metal of the catalyst 20 while suppressing deterioration of exhaust emissions. The downstream catalyst 23 is capable of removing HC, CO, and NOx flowing out from the catalyst 20.

In the present embodiment, the air-fuel ratio control unit 71 executes lean control that brings the air-fuel ratio of inflow exhaust gas to an air-fuel ratio leaner than the stoichiometric air-fuel ratio and rich control that brings the air-fuel ratio of inflow exhaust gas to an air-fuel ratio richer than the stoichiometric air-fuel ratio as the degradation determination control. With this configuration, it is possible to detect degradation of both the precious metal (such as Rh) that mainly functions as the reduction active sites and the precious metal (such as Pt and Pd) that mainly functions as the oxidation active sites. In other words, it is possible to detect both the degradation mode in which the oxidation capability of the catalyst 20 decreases because of degradation of the precious metal of the catalyst 20 and the degradation mode in which the reduction capability of the catalyst 20 decreases because of degradation of the precious metal of the catalyst 20.

The oxygen storage amount of the catalyst 20 gradually increases in the lean control; whereas the oxygen storage amount of the catalyst 20 gradually reduces in the rich control. When the reduction capability of the catalyst 20 is low because of degradation of the precious metal of the catalyst 20, the air-fuel ratio of exhaust gas flowing out from the catalyst 20, that is, the output air-fuel ratio of the downstream air-fuel ratio sensor 41, increases from the stoichiometric air-fuel ratio (becomes leaner than the stoichiometric air-fuel ratio) while the oxygen storage amount of the catalyst 20 is increasing in the lean control, as is apparent from FIG. 4. For this reason, for example, when the air-fuel ratio detected by the downstream air-fuel ratio sensor 41 while the oxygen storage amount of the catalyst 20 is increasing in the lean control, an average of the air-fuel ratio, a variation in the air-fuel ratio, or a slope of the air-fuel ratio is greater than or equal to a lean-side determination value, the degradation determination unit 72 determines that the precious metal of the catalyst 20 is degraded.

On the other hand, when the oxidation capability of the catalyst 20 is low because of degradation of the precious metal of the catalyst 20, the air-fuel ratio of exhaust gas flowing out from the catalyst 20, that is, the output air-fuel ratio of the downstream air-fuel ratio sensor 41, decreases from the stoichiometric air-fuel ratio (becomes richer than the stoichiometric air-fuel ratio) while the oxygen storage amount of the catalyst 20 is reducing in the rich control, as is apparent from FIG. 4. For this reason, for example, when the air-fuel ratio detected by the downstream air-fuel ratio sensor 41 while the oxygen storage amount of the catalyst 20 is reducing in the rich control, an average of the air-fuel ratio, a variation in the air-fuel ratio, or a slope of the air-fuel ratio is less than or equal to a rich-side determination value, the degradation determination unit 72 determines that the precious metal of the catalyst 20 is degraded.

In the present embodiment, the air-fuel ratio control unit 71 successively executes the lean control and the rich control as the degradation determination control. In this case, control to be executed first may be any one of the lean control and the rich control. As described above, the oxygen storage amount of the catalyst 20 gradually increases in the lean control; whereas the oxygen storage amount of the catalyst 20 gradually reduces in the rich control. For this reason, by successively executing the lean control and the rich control, it is possible to suppress fluctuations in the oxygen storage amount of the catalyst 20 when it is determined whether the catalyst 20 is degraded. Therefore, it is possible to suppress deterioration of exhaust emissions resulting from a deviation of the oxygen storage amount of the catalyst 20 from an appropriate value after determination as to whether the catalyst 20 is degraded.

Catalyst Degradation Determination Process

Figure 5:
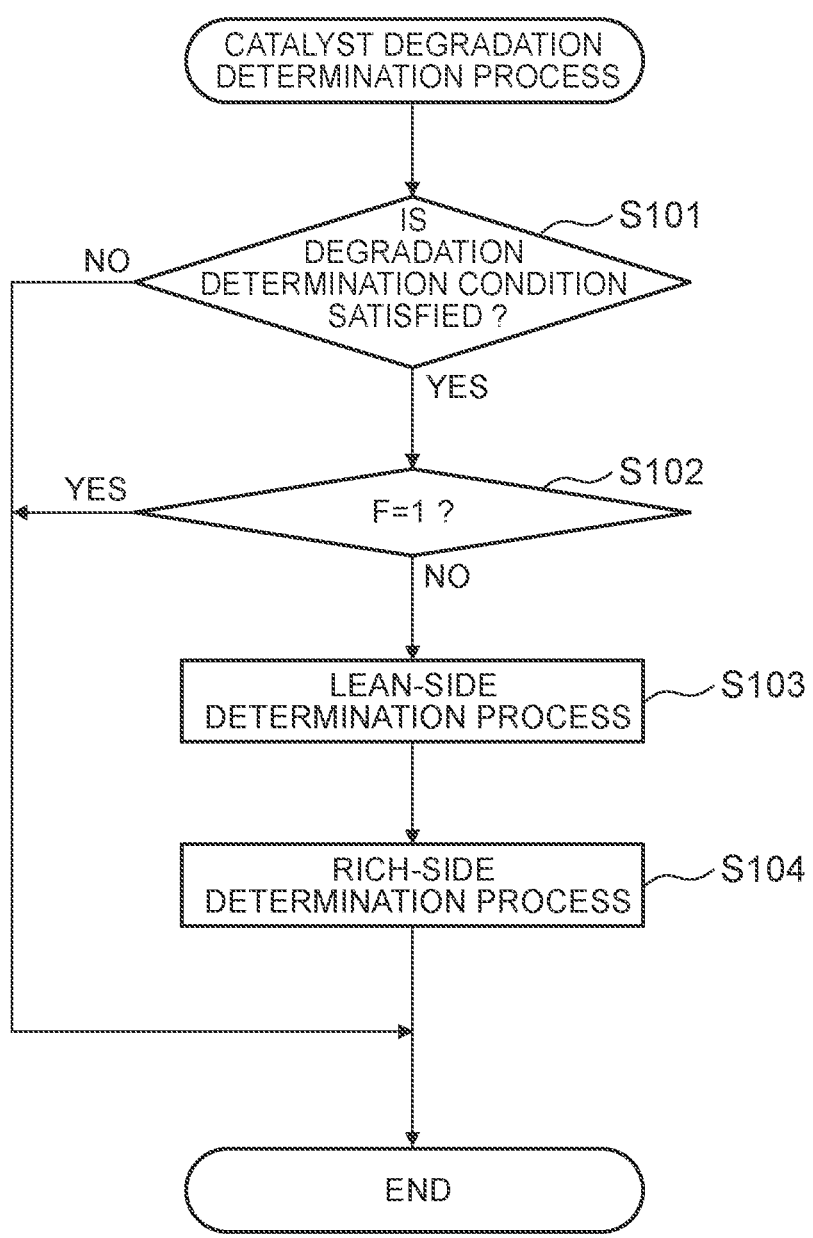
FIG. 5 is a flowchart that shows a control routine of a catalyst degradation determination process in the first embodiment of the disclosure.

Hereinafter, control for determining whether the upstream catalyst 20 is degraded in the present embodiment will be described in detail with reference to the flowcharts of FIG. 5 to FIG. 7. FIG. 5 is a flowchart that shows a control routine of a catalyst degradation determination process in the first embodiment of the disclosure. The control routine is repeatedly executed by the ECU 31 after startup of the internal combustion engine.

Initially, in step S101, the degradation determination unit 72 determines whether a degradation determination condition is satisfied. The degradation determination condition is satisfied when a predetermined period of time elapses after startup of the internal combustion engine. The degradation determination condition may include a condition in which the temperatures of the catalyst 20 and the downstream catalyst 23 are higher than or equal to a predetermined activating temperature, a condition in which the temperatures of the upstream air-fuel ratio sensor 40 and the downstream air-fuel ratio sensor 41 are higher than or equal to a predetermined activating temperature, or other conditions.

When the degradation determination unit 72 determines in step S101 that the degradation determination condition is not satisfied, the control routine ends. On the other hand, when the degradation determination unit 72 determines in step S101 that the degradation determination condition is satisfied, the control routine proceeds to step S102.

In step S102, the degradation determination unit 72 determines whether a determination flag F is one. The determination flag F is a flag that is set to zero when an ignition switch of the vehicle on which the internal combustion engine is mounted is turned on, and is set to one when determination as to whether the catalyst 20 is degraded is complete. When the degradation determination unit 72 determines in step S102 that the determination flag F is one, the control routine ends. Therefore, with the control routine, while the ignition switch of the vehicle is on, determination as to whether the catalyst 20 is degraded is performed once.

On the other hand, when the degradation determination unit 72 determines in step S102 that the determination flag F is zero, the control routine proceeds to step S103.

Figure 6:
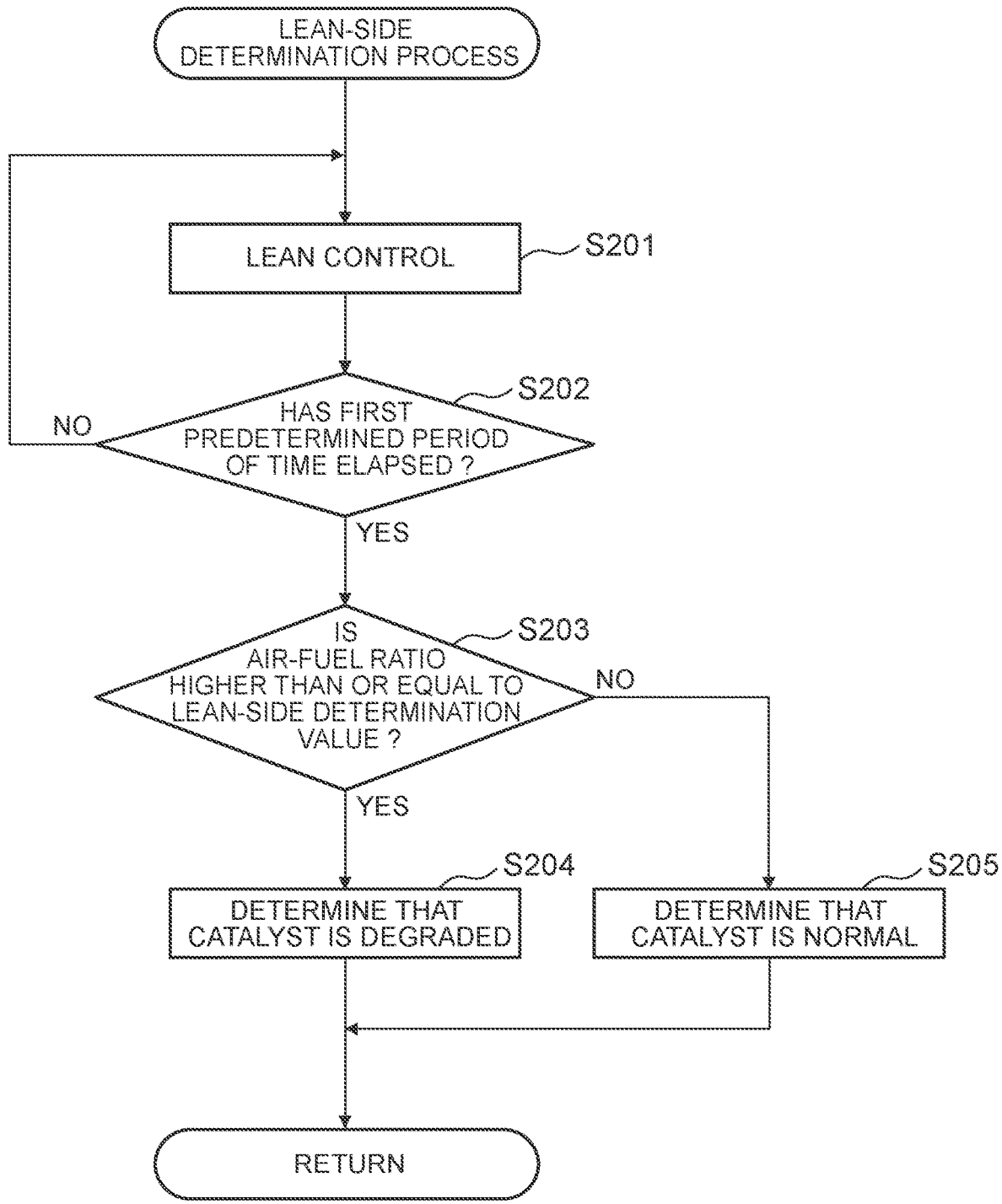
FIG. 6 is a flowchart that shows a control routine of a lean-side determination process in the first embodiment of the disclosure.

In step S103, a lean-side determination process shown in FIG. 6 is executed.

In the lean-side determination process, initially, in step S201, the air-fuel ratio control unit 71 executes the lean control that brings the air-fuel ratio of inflow exhaust gas to an air-fuel ratio leaner than the stoichiometric air-fuel ratio. Specifically, the air-fuel ratio control unit 71 sets the target air-fuel ratio of inflow exhaust gas to a lean set air-fuel ratio leaner than the stoichiometric air-fuel ratio and controls the fuel injection amount of each fuel injection valve 11 such that the air-fuel ratio of inflow exhaust gas coincides with the target air-fuel ratio. The lean set air-fuel ratio is determined in advance and set to any value within the range of, for example, 14.8 to 16.6.

Subsequently, in step S202, the air-fuel ratio control unit 71 determines whether a first predetermined period of time has elapsed from when the lean control is started. The first predetermined period of time is determined in advance and set such that the oxygen storage amount of the catalyst 20 does not reach the maximum oxygen storage amount through the lean control. For this reason, the first predetermined period of time is set such that the amount of oxygen that is stored in the catalyst 20 during the lean control is less than the maximum oxygen storage amount of an unused (new) catalyst 20. For example, the first predetermined period of time is set such that the amount of oxygen that is stored in the catalyst 20 during the lean control is $1/10$ to $9/10$, desirably, $1/10$ to $2/3$, of the maximum oxygen storage amount of an unused (new) catalyst 20.

When the air-fuel ratio control unit 71 determines in step S202 that the first predetermined period of time has not elapsed, the control routine returns to step S201, and the lean control is continued. On the other hand, when the air-fuel ratio control unit 71 determines in step S202 that the first predetermined period of time has elapsed, the air-fuel ratio control unit 71 terminates the lean control, and the control routine proceeds to step S203. In other words, the air-fuel ratio control unit 71 executes the lean control only for the first predetermined period of time.

In step S203, the degradation determination unit 72 determines whether the air-fuel ratio detected by the downstream air-fuel ratio sensor 41 while the oxygen storage amount of the catalyst 20 is increasing in the lean control is higher than or equal to the lean-side determination value. As an air-fuel ratio that is used in this determination, for example, the air-fuel ratio detected by the downstream air-fuel ratio sensor 41 when the lean control is terminated is used. Alternatively, the maximum value of the air-fuel ratio detected by the downstream air-fuel ratio sensor 41 during the lean control may be used. The lean-side determination value is determined in advance and set to an air-fuel ratio leaner than the stoichiometric air-fuel ratio. The lean-side determination value is set to any value within the range of, for example, 14.63 to 15.

When the degradation determination unit 72 determines in step S203 that the air-fuel ratio detected by the downstream air-fuel ratio sensor 41 is higher than or equal to the lean-side determination value, the control routine proceeds to step S204. In step S204, the degradation determination unit 72 determines that the precious metal of the catalyst 20 is degraded. Specifically, the degradation determination unit 72 determines that the reduction capability of the catalyst 20 is low because of degradation of the precious metal of the catalyst 20. To inform a driver that the catalyst 20 is abnormal, the degradation determination unit 72 lights up an alarm lamp provided in the vehicle on which the internal combustion engine is mounted. The degradation determination unit 72 may cause the memory (ROM 34 or RAM 33) of the ECU 31 or another storage device to store a failure code associated with a low reduction capability. After step S204, the control routine proceeds to step S104 of FIG. 5.

On the other hand, when the degradation determination unit 72 determines in step S203 that the air-fuel ratio detected by the downstream air-fuel ratio sensor 41 is richer than the lean-side determination value, the control routine proceeds to step S205. In step S205, the degradation determination unit 72 determines that the catalyst 20 is normal. In other words, the degradation determination unit 72 determines that the precious metal of the catalyst 20 is not degraded. After step S205, the control routine proceeds to step S104 of FIG. 5.

Figure 7:
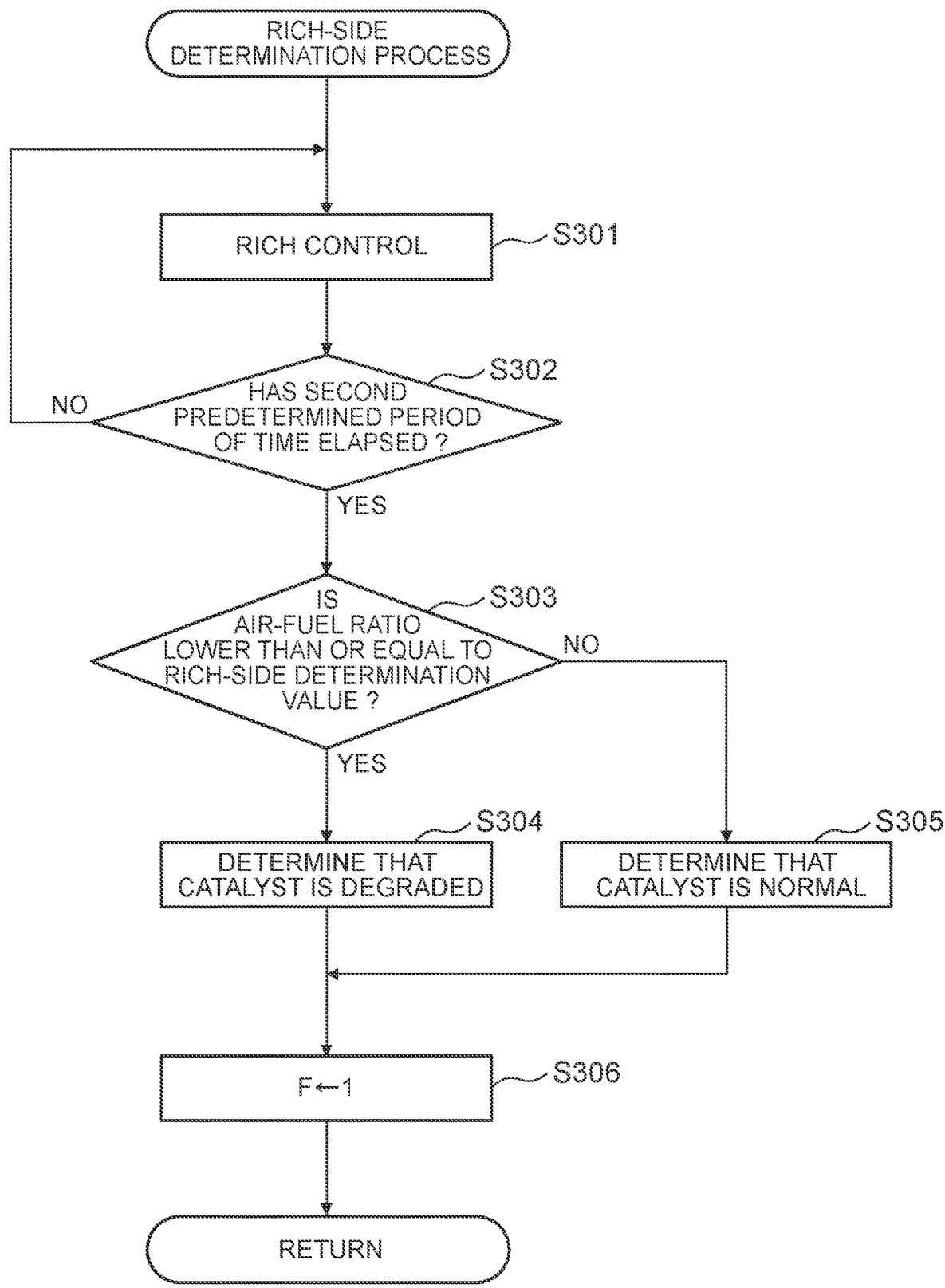
FIG. 7 is a flowchart that shows a control routine of a rich-side determination process in the first embodiment of the disclosure.

In step S104, a rich-side determination process shown in FIG. 7 is executed. In the rich-side determination process, initially, in step S301, the air-fuel ratio control unit 71 executes the rich control that brings the air-fuel ratio of inflow exhaust gas to a rich air-fuel ratio. Specifically, the air-fuel ratio control unit 71 sets the target air-fuel ratio of inflow exhaust gas to a rich set air-fuel ratio richer than the stoichiometric air-fuel ratio and controls the fuel injection amount of each fuel injection valve 11 such that the air-fuel ratio of inflow exhaust gas coincides with the target air-fuel ratio. Therefore, the target air-fuel ratio of inflow exhaust gas is switched from the lean set air-fuel ratio to the rich set air-fuel ratio. The rich set air-fuel ratio is determined in advance and set to any value within the range of, for example, 12.6 to 14.4.

Subsequently, in step S302, the air-fuel ratio control unit 71 determines whether a second predetermined period of time has elapsed from when the rich control is started. The second predetermined period of time is determined in advance and set such that the oxygen storage amount of the catalyst 20 does not reach zero through the rich control. For this reason, the second predetermined period of time is set such that the amount of oxygen that is released from the catalyst 20 during the rich control is less than the maximum oxygen storage amount of an unused (new) catalyst 20. For example, the second predetermined period of time is set such that the amount of oxygen that is released from the catalyst 20 during the rich control is $1/10$ to $9/10$, desirably, $1/10$ to $2/3$, of the maximum oxygen storage amount of an unused (new) catalyst 20.

When the air-fuel ratio control unit 71 determines in step S302 that the second predetermined period of time has not elapsed, the control routine returns to step S301, and the rich control is continued. On the other hand, when the air-fuel ratio control unit 71 determines in step S302 that the second predetermined period of time has elapsed, the control routine proceeds to step S303, and the air-fuel ratio control unit 71 terminates the rich control. In other words, the air-fuel ratio control unit 71 executes the rich control only for the second predetermined period of time. After termination of the rich control, the air-fuel ratio of inflow exhaust gas is controlled according to the operating status of the internal combustion engine.

In step S303, the degradation determination unit 72 determines whether the air-fuel ratio detected by the downstream air-fuel ratio sensor 41 while the oxygen storage amount of the catalyst 20 is reducing in the rich control is lower than or equal to the rich-side determination value. As an air-fuel ratio that is used in this determination, for example, the air-fuel ratio detected by the downstream air-fuel ratio sensor 41 when the rich control is terminated is used. Alternatively, the minimum value of the air-fuel ratio detected by the downstream air-fuel ratio sensor 41 during the rich control may be used. The rich-side determination value is determined in advance and set to an air-fuel ratio richer than the stoichiometric air-fuel ratio. The rich-side determination value is set to any value within the range of, for example, 14.2 to 14.57.

When the degradation determination unit 72 determines in step S303 that the air-fuel ratio detected by the downstream air-fuel ratio sensor 41 is lower than or equal to the rich-side determination value, the control routine proceeds to step S304. In step S304, the degradation determination unit 72 determines that the precious metal of the catalyst 20 is degraded. Specifically, the degradation determination unit 72 determines that the oxidation capability of the catalyst 20 is low because of degradation of the precious metal of the catalyst 20. To inform a driver that the catalyst 20 is abnormal, the degradation determination unit 72 lights up an alarm lamp provided in the vehicle on which the internal combustion engine is mounted. The degradation determination unit 72 may cause the memory (ROM 34 or RAM 33) of the ECU 31 or another storage device to store a failure code associated with a low oxidation capability.

On the other hand, when the degradation determination unit 72 determines in step S303 that the air-fuel ratio detected by the downstream air-fuel ratio sensor 41 is leaner than the rich-side determination value, the control routine proceeds to step S305. In step S305, the degradation determination unit 72 determines that the catalyst 20 is normal. In other words, the degradation determination unit 72 determines that the precious metal of the catalyst 20 is not degraded.

After step S304 or step S305, the control routine proceeds to step S306. In step S306, the degradation determination unit 72 sets the determination flag F to one. After step S306, the control routine ends.

Alternatively, in step S203 of FIG. 6, the degradation determination unit 72 may determine whether the average of the air-fuel ratio detected by the downstream air-fuel ratio sensor 41 while the oxygen storage amount of the catalyst 20 is increasing in the lean control is higher than or equal to a lean-side determination value.

Alternatively, in step S203 of FIG. 6, the degradation determination unit 72 may determine whether a variation in the air-fuel ratio detected by the downstream air-fuel ratio sensor 41 while the oxygen storage amount of the catalyst 20 is increasing in the lean control is greater than or equal to a lean-side determination value. A variation in the air-fuel ratio is calculated as, for example, a value obtained by subtracting the air-fuel ratio detected by the downstream air-fuel ratio sensor 41 when the lean control is started or the minimum value of the air-fuel ratio detected by the downstream air-fuel ratio sensor 41 during the lean control from the air-fuel ratio detected by the downstream air-fuel ratio sensor 41 when the lean control is terminated or the maximum value of the air-fuel ratio detected by the downstream air-fuel ratio sensor 41 during the lean control. In this case, the lean-side determination value is set to a positive value and set to any value within the range of, for example, 0.03 to 0.4.

Alternatively, in step S203 of FIG. 6, the degradation determination unit 72 may determine whether a slope of the air-fuel ratio detected by the downstream air-fuel ratio sensor 41 while the oxygen storage amount of the catalyst 20 is increasing in the lean control is greater than or equal to a lean-side determination value. In this case, the lean-side determination value is set to a positive value.

As in the case of time t2 in the second graph from the bottom in FIG. 4, the output air-fuel ratio of the downstream air-fuel ratio sensor 41 when the lean control is started may be richer than the stoichiometric air-fuel ratio. In this case, if the air-fuel ratio just after the start of the lean control and before the output air-fuel ratio of the downstream air-fuel ratio sensor 41 reaches the stoichiometric air-fuel ratio is used to perform determination as to degradation, there are concerns about erroneous determination.

For this reason, when the output air-fuel ratio of the downstream air-fuel ratio sensor 41 at the time when the lean control is started is richer than the stoichiometric air-fuel ratio, the air-fuel ratio after the output air-fuel ratio of the downstream air-fuel ratio sensor 41 has reached the stoichiometric air-fuel ratio is used to perform determination as to degradation. A variation in the air-fuel ratio is calculated as, for example, a value obtained by subtracting the stoichiometric air-fuel ratio from the air-fuel ratio detected by the downstream air-fuel ratio sensor 41 when the lean control is terminated or the maximum value of the air-fuel ratio detected by the downstream air-fuel ratio sensor 41 during the lean control. To reduce such erroneous determination, the air-fuel ratio control unit 71 may start the lean control when the output air-fuel ratio of the downstream air-fuel ratio sensor 41 is the stoichiometric air-fuel ratio.

Alternatively, in step S303 of FIG. 7, the degradation determination unit 72 determines whether the average of the air-fuel ratio detected by the downstream air-fuel ratio sensor 41 while the oxygen storage amount of the catalyst 20 is reducing in the rich control is lower than or equal to a rich-side determination value.

Alternatively, in step S303 of FIG. 7, the degradation determination unit 72 may determine whether a variation in the air-fuel ratio detected by the downstream air-fuel ratio sensor 41 while the oxygen storage amount of the catalyst 20 is reducing in the rich control is less than or equal to a rich-side determination value. A variation in the air-fuel ratio is calculated as, for example, a value obtained by subtracting the air-fuel ratio detected by the downstream air-fuel ratio sensor 41 when the rich control is started or the maximum value of the air-fuel ratio detected by the downstream air-fuel ratio sensor 41 during the rich control from the air-fuel ratio detected by the downstream air-fuel ratio sensor 41 when the rich control is terminated or the minimum value of the air-fuel ratio detected by the downstream air-fuel ratio sensor 41 during the rich control. In this case, the rich-side determination value is set to a negative value and set to any value within the range of, for example, −0.4 to −0.03.

Alternatively, in step S303 of FIG. 7, the degradation determination unit 72 may determine whether a slope of the air-fuel ratio detected by the downstream air-fuel ratio sensor 41 while the oxygen storage amount of the catalyst 20 is reducing in the rich control is less than or equal to a rich-side determination value. In this case, the rich-side determination value is set to a negative value.

As in the case of time t1 in the bottom graph in FIG. 4, the output air-fuel ratio of the downstream air-fuel ratio sensor 41 when the rich control is started may be leaner than the stoichiometric air-fuel ratio. In this case, if the air-fuel ratio just after the start of the rich control and before the output air-fuel ratio of the downstream air-fuel ratio sensor 41 reaches the stoichiometric air-fuel ratio is used to perform determination as to degradation, there are concerns about erroneous determination.

For this reason, when the output air-fuel ratio of the downstream air-fuel ratio sensor 41 at the time when the rich control is started is leaner than the stoichiometric air-fuel ratio, the air-fuel ratio after the output air-fuel ratio of the downstream air-fuel ratio sensor 41 has reached the stoichiometric air-fuel ratio is used to perform determination as to degradation. A variation in the air-fuel ratio is calculated as, for example, a value obtained by subtracting the stoichiometric air-fuel ratio from the air-fuel ratio detected by the downstream air-fuel ratio sensor 41 when the rich control is terminated or the minimum value of the air-fuel ratio detected by the downstream air-fuel ratio sensor 41 during the rich control. To reduce such erroneous determination, the air-fuel ratio control unit 71 may start the rich control when the output air-fuel ratio of the downstream air-fuel ratio sensor 41 is the stoichiometric air-fuel ratio.

A deviation can occur in a signal output from the downstream air-fuel ratio sensor 41 because of initial variations, aged degradation, or the like. For this reason, the value of a signal output from the downstream air-fuel ratio sensor 41, which corresponds to the stoichiometric air-fuel ratio, may be corrected by a known technique.

The lean-side determination process in step S103 of FIG. 5 and the rich-side determination process in step S104 of FIG. 5 may be switched in order. In this case, step S306 of FIG. 7 is executed after step S204 or step S205 of FIG. 6.

Regardless of the order of the lean-side determination process and the rich-side determination process, the lean-side determination process and the rich-side determination process each may be repeatedly executed twice or more. Regardless of the lean-side determination process and the rich-side determination process, the air-fuel ratio of inflow exhaust gas may be temporarily set to the stoichiometric air-fuel ratio between the lean control in the lean-side determination process and the rich control in the rich-side determination process.

Only one of the lean-side determination process and the rich-side determination process may be executed according to the degradation characteristics and the like of the catalyst 20.

Second Embodiment

A catalyst degradation detection apparatus according to a second embodiment is basically similar in configuration and control to the catalyst degradation detection apparatus according to the first embodiment except for the following points. Therefore, hereinafter, the second embodiment of the disclosure will be mainly described on portions different from the first embodiment.

As described above, to determine whether the precious metal of the catalyst 20 is degraded, degradation determination control is executed such that the oxygen storage amount of the catalyst 20 varies. However, when the lean control is executed as the degradation determination control while the oxygen storage amount of the catalyst 20 is large, the oxygen storage amount of the catalyst 20 may reach the maximum oxygen storage amount during the lean control. In this case, even when the catalyst 20 is normal, NOx flows out from the catalyst 20, and the output air-fuel ratio of the downstream air-fuel ratio sensor 41 is leaner than the stoichiometric air-fuel ratio. For this reason, even when the catalyst 20 is normal, there are concerns that it may be erroneously determined that the reduction capability of the catalyst 20 is low because of degradation of the precious metal of the catalyst 20.

On the other hand, when the rich control is executed as the degradation determination control while the oxygen storage amount of the catalyst 20 is small, the oxygen storage amount of the catalyst 20 may reach zero during the rich control. In this case, even when the catalyst 20 is normal, HC and CO flow out from the catalyst 20, and the output air-fuel ratio of the downstream air-fuel ratio sensor 41 is richer than the stoichiometric air-fuel ratio. For this reason, even when the catalyst 20 is normal, there are concerns that it may be erroneously determined that the oxidation capability of the catalyst 20 is low because of degradation of the precious metal of the catalyst 20.

When the oxygen storage amount of the catalyst 20 reaches the maximum oxygen storage amount in the lean control as described above, the catalyst 20 is placed in a reduction atmosphere, and the removal performance of the catalyst 20 significantly deteriorates. For this reason, the amount of NOx flowing out from the catalyst 20 at this time is greater than the amount of NOx flowing out from the catalyst 20 because of a low reduction capability while the oxygen storage amount of the catalyst 20 is varying. On the other hand, when the oxygen storage amount of the catalyst 20 reaches zero in the rich control as described above, the catalyst 20 is placed in an oxidation atmosphere, and the removal performance of the catalyst 20 significantly deteriorates. For this reason, the amounts of HC and CO flowing out from the catalyst 20 at this time are greater than the amounts of HC and CO flowing out from the catalyst 20 because of a low oxidation capability while the oxygen storage amount of the catalyst 20 is varying.

In the second embodiment, when a difference between the output air-fuel ratio of the downstream air-fuel ratio sensor 41 and the stoichiometric air-fuel ratio has reached an upper limit in the degradation determination control, the degradation determination unit 72 does not determine whether the precious metal of the catalyst 20 is degraded. With this configuration, it is possible to reduce erroneous determination and, by extension, it is possible to increase the accuracy of detecting degradation of the precious metal of the catalyst 20.

Specifically, when the output air-fuel ratio of the downstream air-fuel ratio sensor 41 has reached an upper limit air-fuel ratio leaner than the stoichiometric air-fuel ratio in the lean control, the degradation determination unit 72 does not determine whether the precious metal of the catalyst 20 is degraded. When the output air-fuel ratio of the downstream air-fuel ratio sensor 41 has reached a lower limit air-fuel ratio richer than the stoichiometric air-fuel ratio in the rich control, the degradation determination unit 72 also does not determine whether the precious metal of the catalyst 20 is degraded.

Catalyst Degradation Determination Process

Figure 8:
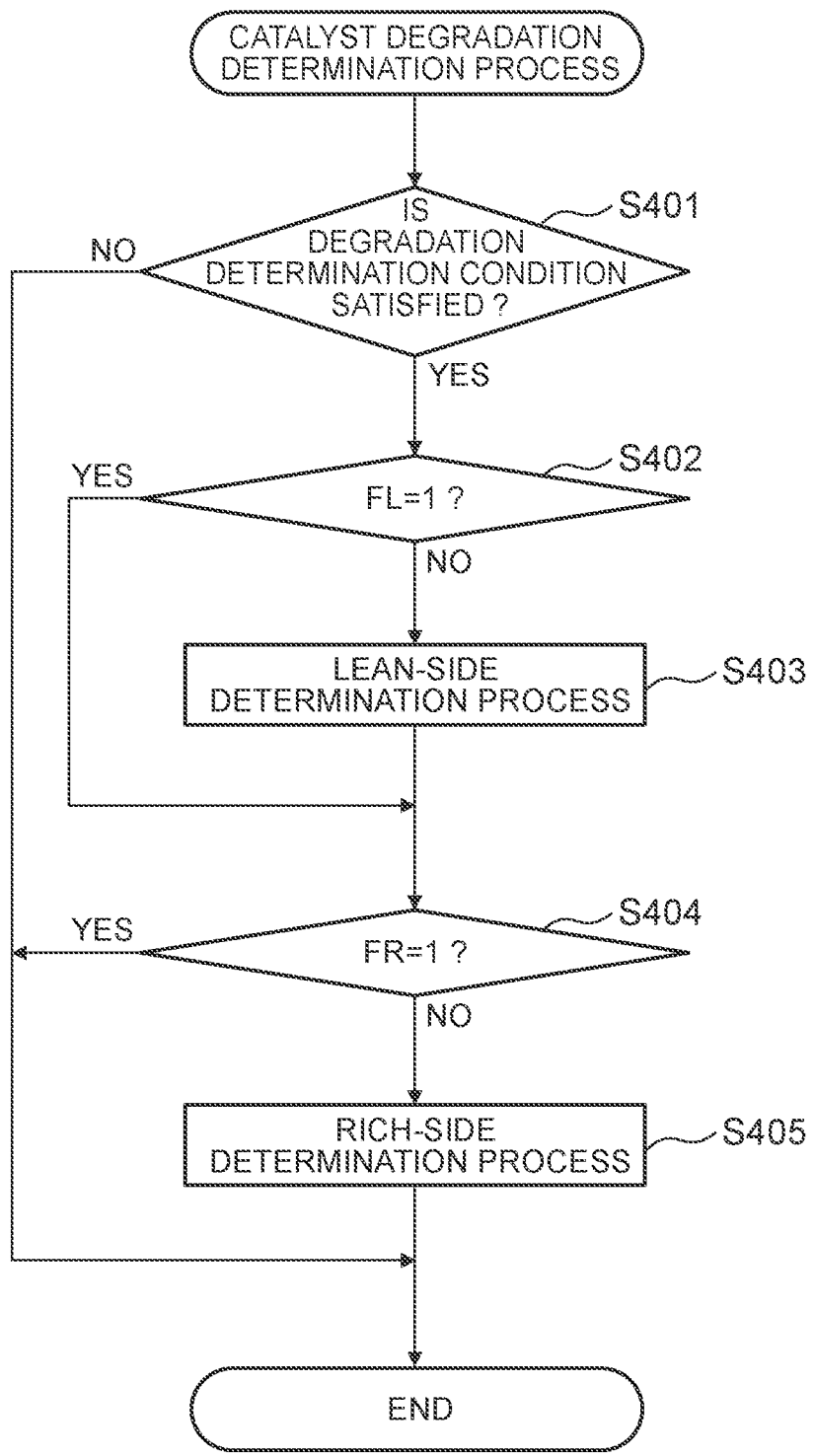
FIG. 8 is a flowchart that shows a control routine of a catalyst degradation determination process in a second embodiment of the disclosure.

FIG. 8 is a flowchart that shows a control routine of a catalyst degradation determination process in the second embodiment of the disclosure. The control routine is repeatedly executed by the ECU 31 after startup of the internal combustion engine.

Initially, in step S401, as in the case of step S101 of FIG. 5, the degradation determination unit 72 determines whether a degradation determination condition is satisfied. When the degradation determination unit 72 determines that the degradation determination condition is not satisfied, the control routine ends. On the other hand, when the degradation determination unit 72 determines that the degradation determination condition is satisfied, the control routine proceeds to step S402.

In step S402, the degradation determination unit 72 determines whether a lean-side determination flag FL is one. The lean-side determination flag FL is a flag that is set to zero when the ignition switch of the vehicle on which the internal combustion engine is mounted is turned on, and is set to one when determination as to whether the catalyst 20 is degraded is complete in the lean-side determination process.

Figure 9:
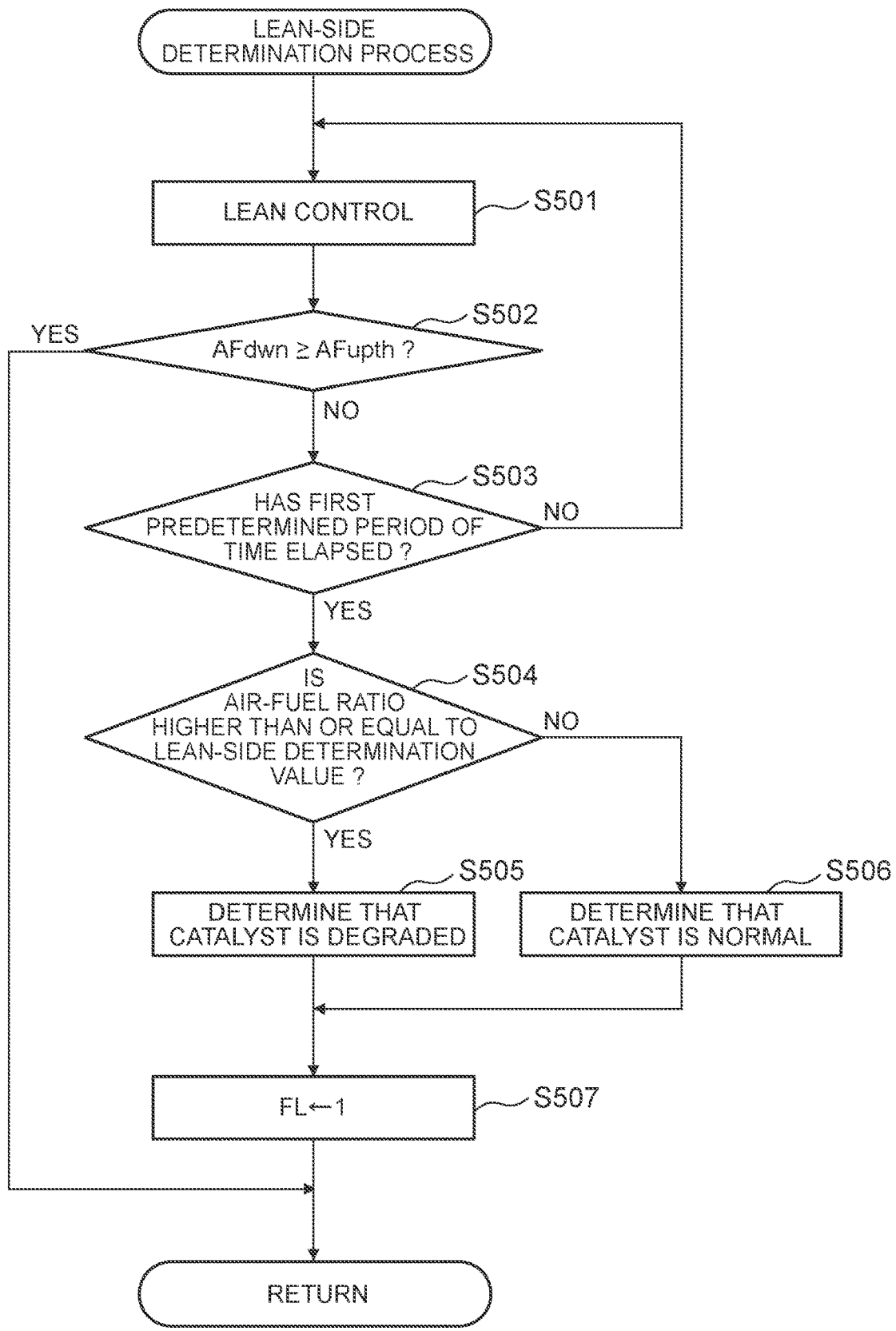
FIG. 9 is a flowchart that shows a control routine of a lean-side determination process in the second embodiment of the disclosure.

When the degradation determination unit 72 determines in step S402 that the lean-side determination flag FL is zero, the control routine proceeds to step S403. In step S403, the lean-side determination process shown in FIG. 9 is executed.

In the lean-side determination process, initially, in step S501, as in the case of step S201 of FIG. 6, the air-fuel ratio control unit 71 executes the lean control that brings the air-fuel ratio of inflow exhaust gas to an air-fuel ratio leaner than the stoichiometric air-fuel ratio.

Subsequently, in step S502, the air-fuel ratio control unit 71 determines whether an output air-fuel ratio AFdwn of the downstream air-fuel ratio sensor 41 is higher than or equal to an upper limit air-fuel ratio AFupth leaner than the stoichiometric air-fuel ratio. The upper limit air-fuel ratio AFupth is determined in advance and set to an air-fuel ratio leaner than the air-fuel ratio that is detected when the reduction capability is low while the oxygen storage amount of the catalyst 20 is increasing. In other words, the upper limit air-fuel ratio AFupth is set to a value leaner than a lean-side determination value that is used in step S504 (described later).

When the air-fuel ratio control unit 71 determines in step S502 that the output air-fuel ratio AFdwn of the downstream air-fuel ratio sensor 41 is richer than the upper limit air-fuel ratio AFupth, the control routine proceeds to step S503. In step S503, as in the case of step S202 of FIG. 6, the air-fuel ratio control unit 71 determines whether the first predetermined period of time has elapsed from when the lean control is started. When the air-fuel ratio control unit 71 determines that the first predetermined period of time has not elapsed, the control routine returns to step S501, the lean control is continued, and the determination of step S502 is performed again.

When the air-fuel ratio control unit 71 determines in step S502 that the output air-fuel ratio AFdwn of the downstream air-fuel ratio sensor 41 is higher than or equal to the upper limit air-fuel ratio AFupth, the air-fuel ratio control unit 71 terminates the lean control, and the control routine proceeds to step S404 of FIG. 8. In this case, in the lean-side determination process, it is not determined whether the precious metal of the catalyst 20 is degraded.

On the other hand, when the air-fuel ratio control unit 71 determines in step S503 that the first predetermined period of time has elapsed, the air-fuel ratio control unit 71 terminates the lean control, and the control routine proceeds to step S504. In step S504, as in the case of step S203 of FIG. 6, the degradation determination unit 72 determines whether the air-fuel ratio detected by the downstream air-fuel ratio sensor 41 while the oxygen storage amount of the catalyst 20 is increasing in the lean control is higher than or equal to the lean-side determination value.

When the degradation determination unit 72 determines in step S504 that the air-fuel ratio detected by the downstream air-fuel ratio sensor 41 is higher than or equal to the lean-side determination value, the control routine proceeds to step S505. In step S505, as in the case of step S204 of FIG. 6, the degradation determination unit 72 determines that the precious metal of the catalyst 20 is degraded.

On the other hand, when the degradation determination unit 72 determines in step S504 that the air-fuel ratio detected by the downstream air-fuel ratio sensor 41 is richer than the lean-side determination value, the control routine proceeds to step S506. In step S506, as in the case of step S205 of FIG. 6, the degradation determination unit 72 determines that the catalyst 20 is normal.

After step S505 or step S506, the control routine proceeds to step S507. In step S507, the degradation determination unit 72 sets the lean-side determination flag FL to one. After step S507, the control routine proceeds to step S404 of FIG. 8.

On the other hand, when the degradation determination unit 72 determines in step S402 that the lean-side determination flag FL is one, the control routine skips step S403 and proceeds to step S404.

In step S404, the degradation determination unit 72 determines whether a rich-side determination flag FR is one. The rich-side determination flag FR is a flag that is set to zero when the ignition switch of the vehicle on which the internal combustion engine is mounted is turned on, and is set to one when determination as to whether the catalyst 20 is degraded is complete in the rich-side determination process.

Figure 10:
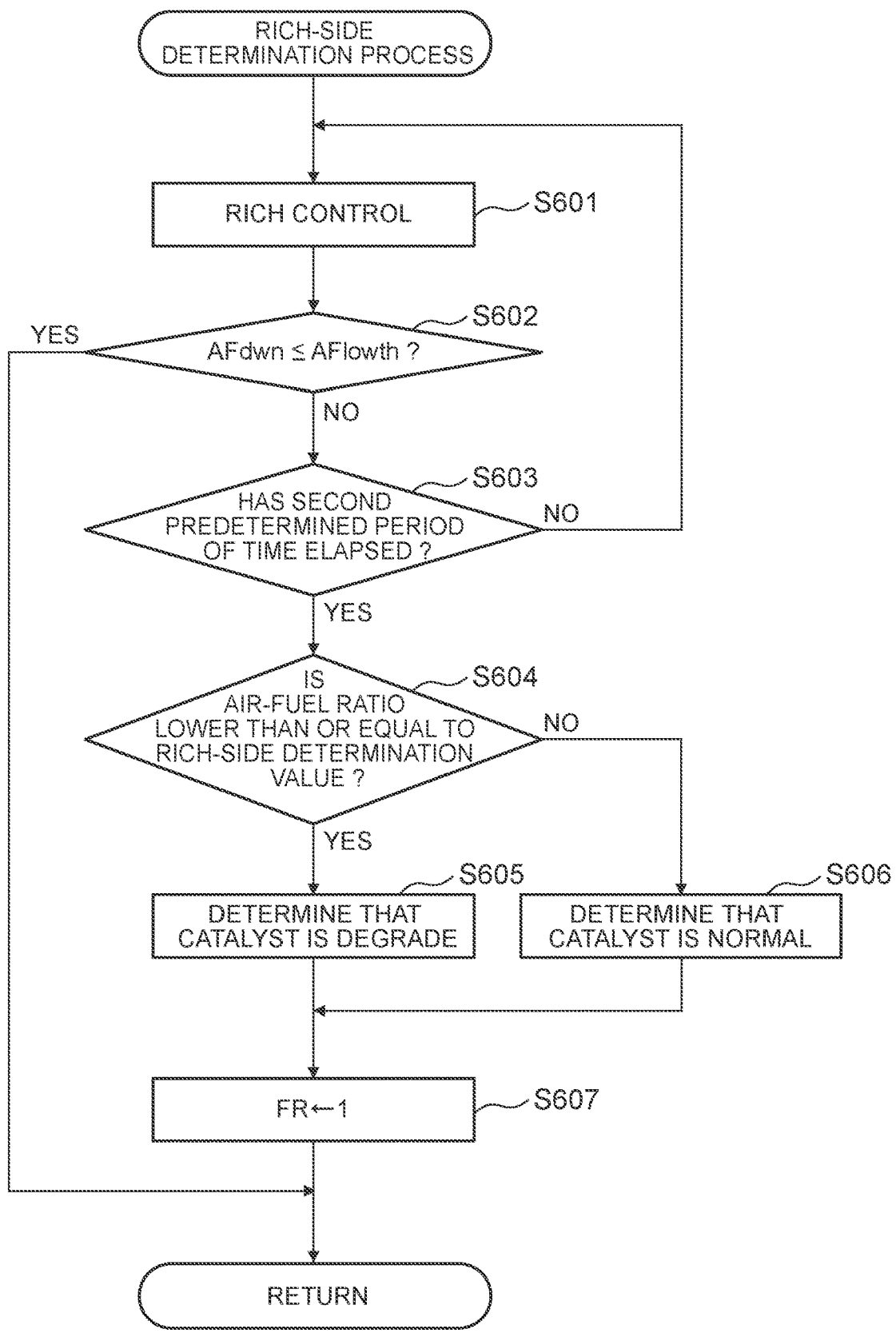
FIG. 10 is a flowchart that shows a control routine of a rich-side determination process in the second embodiment of the disclosure.

When the degradation determination unit 72 determines in step S404 that the rich-side determination flag FR is one, the control routine ends. When the degradation determination unit 72 determines in step S404 that the rich-side determination flag FR is zero, the control routine proceeds to step S405. In step S405, the rich-side determination process shown in FIG. 10 is executed.

In the rich-side determination process, initially, in step S601, as in the case of step S301 of FIG. 7, the air-fuel ratio control unit 71 executes the rich control that brings the air-fuel ratio of inflow exhaust gas to an air-fuel ratio richer than the stoichiometric air-fuel ratio.

Subsequently, in step S602, the air-fuel ratio control unit 71 determines whether an output air-fuel ratio AFdwn of the downstream air-fuel ratio sensor 41 is lower than or equal to a lower limit air-fuel ratio AFlowth richer than the stoichiometric air-fuel ratio. The lower limit air-fuel ratio AFlowth is determined in advance and set to an air-fuel ratio richer than the air-fuel ratio that is detected when the oxidation capability is low while the oxygen storage amount of the catalyst 20 is reducing. In other words, the lower limit air-fuel ratio AFlowth is set to a value richer than a rich-side determination value that is used in step S604 (described later).

When the air-fuel ratio control unit 71 determines in step S602 that the output air-fuel ratio AFdwn of the downstream air-fuel ratio sensor 41 is leaner than the lower limit air-fuel ratio AFlowth, the control routine proceeds to step S603. In step S603, as in the case of step S302 of FIG. 7, the air-fuel ratio control unit 71 determines whether the second predetermined period of time has elapsed from when the rich control is started. When the air-fuel ratio control unit 71 determines that the second predetermined period of time has not elapsed, the control routine returns to step S601, the rich control is continued, and the determination of step S602 is performed again.

When the air-fuel ratio control unit 71 determines in step S602 that the output air-fuel ratio AFdwn of the downstream air-fuel ratio sensor 41 is lower than or equal to the lower limit air-fuel ratio AFlowth, the air-fuel ratio control unit 71 terminates the rich control, and the control routine ends. In this case, in the rich-side determination process, it is not determined whether the precious metal of the catalyst 20 is degraded.

On the other hand, when the air-fuel ratio control unit 71 determines in step S603 that the second predetermined period of time has elapsed, the air-fuel ratio control unit 71 terminates the rich control, and the control routine proceeds to step S604. In step S604, as in the case of step S303 of FIG. 7, the degradation determination unit 72 determines whether the air-fuel ratio detected by the downstream air-fuel ratio sensor 41 while the oxygen storage amount of the catalyst 20 is reducing in the rich control is lower than or equal to the rich-side determination value.

When the degradation determination unit 72 determines in step S604 that the air-fuel ratio detected by the downstream air-fuel ratio sensor 41 is lower than or equal to the rich-side determination value, the control routine proceeds to step S605. In step S605, as in the case of step S304 of FIG. 7, the degradation determination unit 72 determines that the precious metal of the catalyst 20 is degraded.

On the other hand, when the degradation determination unit 72 determines in step S604 that the air-fuel ratio detected by the downstream air-fuel ratio sensor 41 is leaner than the rich-side determination value, the control routine proceeds to step S606. In step S606, as in the case of step S305 of FIG. 7, the degradation determination unit 72 determines that the catalyst 20 is normal.

After step S605 or step S606, the control routine proceeds to step S607. In step S607, the degradation determination unit 72 sets the rich-side determination flag FR to one. After step S607, the control routine ends.

The control routines of FIG. 8 to FIG. 10 may be modified as in the case of the control routines of FIG. 5 to FIG. 7.

In step S502 of FIG. 9, the air-fuel ratio control unit 71 may determine whether the slope of the output air-fuel ratio AFdwn of the downstream air-fuel ratio sensor 41 is greater than or equal to an upper limit. In other words, the degradation determination unit 72 does not need to determine whether the precious metal of the catalyst 20 is degraded when the slope of the air-fuel ratio detected by the downstream air-fuel ratio sensor 41 has reached the upper limit during the lean control. The upper limit is determined in advance and set to a value greater than the slope of the air-fuel ratio that is detected when the reduction capability is low while the oxygen storage amount of the catalyst 20 is increasing.

In step S602 of FIG. 10, the air-fuel ratio control unit 71 may determine whether the slope of the output air-fuel ratio AFdwn of the downstream air-fuel ratio sensor 41 is less than or equal to a lower limit. In other words, the degradation determination unit 72 does not need to determine whether the precious metal of the catalyst 20 is degraded when the slope of the air-fuel ratio detected by the downstream air-fuel ratio sensor 41 has reached the lower limit during the rich control. The lower limit is determined in advance and set to a value less than the slope of the air-fuel ratio that is detected when the oxidation capability is low while the oxygen storage amount of the catalyst 20 is reducing.

Third Embodiment

A catalyst degradation detection apparatus according to a third embodiment is basically similar in configuration and control to the catalyst degradation detection apparatus according to the first embodiment except for the following points. Therefore, hereinafter, the third embodiment of the disclosure will be mainly described on portions different from the first embodiment.

The amount of oxygen the catalyst 20 is able to store is the greatest when the oxygen storage amount of the catalyst 20 is zero. For this reason, when lean control is started at the time when the oxygen storage amount of the catalyst 20 is zero, the oxygen storage amount of the catalyst 20 is less likely to reach the maximum oxygen storage amount during the lean control. In the third embodiment, the air-fuel ratio control unit 71 starts the lean control when the output air-fuel ratio of the downstream air-fuel ratio sensor 41 is lower than or equal to a rich determination air-fuel ratio richer than the stoichiometric air-fuel ratio. With this configuration, it is possible to reduce a situation in which the oxygen storage amount of the catalyst 20 reaches the maximum oxygen storage amount during the lean control and, by extension, it is possible to increase the accuracy of detecting degradation of the precious metal of the catalyst 20.

The amount of oxygen the catalyst 20 is able to release is the greatest when the oxygen storage amount of the oxygen 20 is the maximum oxygen storage amount. For this reason, when rich control is started at the time when the oxygen storage amount of the catalyst 20 is the maximum oxygen storage amount, the oxygen storage amount of the catalyst 20 is less likely to reach zero during the rich control. In the third embodiment, the air-fuel ratio control unit 71 starts the rich control when the output air-fuel ratio of the downstream air-fuel ratio sensor 41 is higher than or equal to a lean determination air-fuel ratio leaner than the stoichiometric air-fuel ratio. With this configuration, it is possible to reduce a situation in which the oxygen storage amount of the catalyst 20 reaches zero during the rich control and, by extension, it is possible to increase the accuracy of detecting degradation of the precious metal of the catalyst 20.

On the other hand, even when lean control is started as described above, there are concerns that the oxygen storage amount of the catalyst 20 reaches the maximum oxygen storage amount during the lean control because of a decrease in the oxygen storage capability of the catalyst 20. Even when rich control is started as described above, there are concerns that the oxygen storage amount of the catalyst 20 reaches zero during the rich control because of a decrease in the oxygen storage capability of the catalyst 20.

Figure 11:
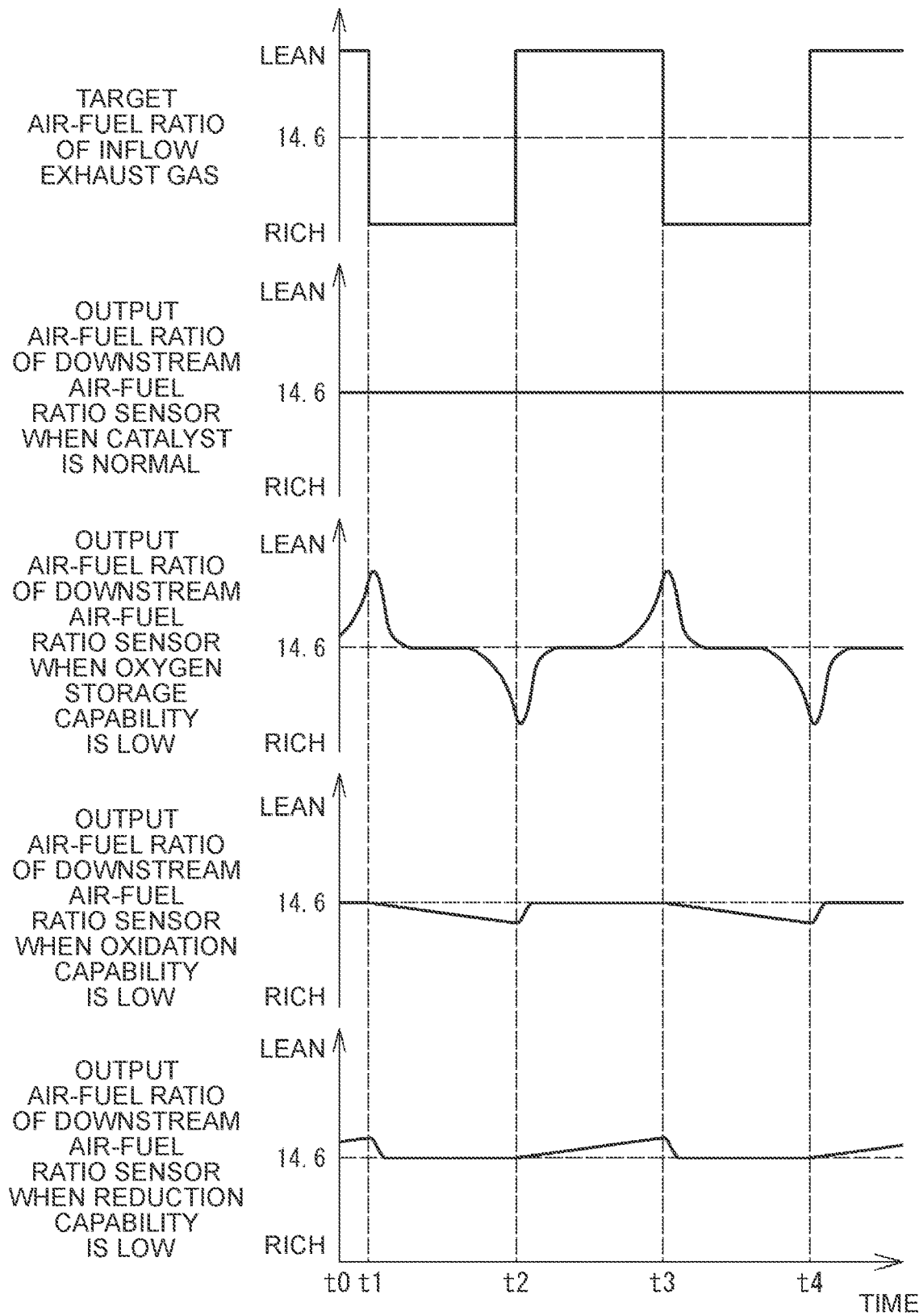
FIG. 11 is a timing chart of an output air-fuel ratio of a downstream air-fuel ratio sensor when the air-fuel ratio of inflow exhaust gas is varied.

FIG. 11 is a timing chart of an output air-fuel ratio of the downstream air-fuel ratio sensor 41 when the air-fuel ratio of inflow exhaust gas is varied. In the example of FIG. 11, the target air-fuel ratio of inflow exhaust gas is controlled as in the case of the example shown in FIG. 4, and FIG. 11 shows the case where the oxygen storage capability of the catalyst 20 is low in addition to the three examples shown in FIG. 4. The case where the oxygen storage capability of the catalyst 20 is low because of degradation of the promoter of the catalyst 20 will be described with reference to the third graph from the top in FIG. 4.

When the oxygen storage capability of the catalyst 20 decreases, the maximum oxygen storage amount the catalyst 20 is able to store also decreases. For this reason, when the target air-fuel ratio of inflow exhaust gas is set to the lean set air-fuel ratio, the oxygen storage amount of the catalyst 20 reaches the maximum oxygen storage amount at timing earlier than the normal catalyst 20. As a result, at time t0, NOx flows out from the catalyst 20, and the output air-fuel ratio of the downstream air-fuel ratio sensor 41 is leaner than the stoichiometric air-fuel ratio.

After that, until the target air-fuel ratio of inflow exhaust gas is switched from the lean set air-fuel ratio to the rich set air-fuel ratio at time t1, the degree of leanness of the output air-fuel ratio of the downstream air-fuel ratio sensor 41 gradually increases. When the target air-fuel ratio of inflow exhaust gas is switched from the lean set air-fuel ratio to the rich set air-fuel ratio, the catalyst 20 releases oxygen to make up for a shortage to oxidize HC and CO. As a result, the atmosphere of the catalyst 20 is brought close to the stoichiometric air-fuel ratio, and HC and CO in exhaust gas are removed in the catalyst 20. Therefore, after time t1, the output air-fuel ratio of the downstream air-fuel ratio sensor 41 converges to the stoichiometric air-fuel ratio.

After time t1, the target air-fuel ratio of inflow exhaust gas is maintained at the rich set air-fuel ratio, and the oxygen storage amount of the catalyst 20 gradually reduces. When the oxygen storage amount of the catalyst 20 reduces to around zero, the catalyst 20 is placed in a reduction atmosphere, and the removal performance of the catalyst 20 decreases. As a result, HC and CO not removed in the catalyst 20 start flowing out from the catalyst 20, and the output air-fuel ratio of the downstream air-fuel ratio sensor 41 varies to a value richer than the stoichiometric air-fuel ratio.

After that, until the target air-fuel ratio of inflow exhaust gas is switched from the rich set air-fuel ratio to the lean set air-fuel ratio at time t2, the degree of richness of the output air-fuel ratio of the downstream air-fuel ratio sensor 41 gradually increases. When the target air-fuel ratio of inflow exhaust gas is switched from the rich set air-fuel ratio to the lean set air-fuel ratio, the catalyst 20 stores excess oxygen in exhaust gas. As a result, the atmosphere of the catalyst 20 is brought close to the stoichiometric air-fuel ratio, and NOx in exhaust gas is removed in the catalyst 20. Therefore, after time t2, the output air-fuel ratio of the downstream air-fuel ratio sensor 41 converges to the stoichiometric air-fuel ratio.

After time t2, the target air-fuel ratio of inflow exhaust gas is maintained at the lean set air-fuel ratio, and the oxygen storage amount of the catalyst 20 gradually increases. When the oxygen storage amount of the catalyst 20 increases to around the maximum oxygen storage amount, the catalyst 20 is placed in an oxidation atmosphere, and the removal performance of the catalyst 20 decreases. As a result, NOx starts flowing out from the catalyst 20, and the output air-fuel ratio of the downstream air-fuel ratio sensor 41 varies to a value leaner than the stoichiometric air-fuel ratio.

After that, until the target air-fuel ratio of inflow exhaust gas is switched from the lean set air-fuel ratio to the rich set air-fuel ratio at time t3, the degree of leanness of the output air-fuel ratio of the downstream air-fuel ratio sensor 41 gradually increases. After time t3, the output air-fuel ratio of the downstream air-fuel ratio sensor 41 varies as in the case after time t1.

Therefore, even when the reduction capability of the catalyst 20 is not low, the target air-fuel ratio of inflow exhaust gas may be leaner than the stoichiometric air-fuel ratio during the lean control because of a decrease in the oxygen storage capability of the catalyst 20. Usually, the degree of leanness at this time is higher than the degree of leanness when the reduction capability of the catalyst 20 is low. For this reason, in the third embodiment, when the output air-fuel ratio of the downstream air-fuel ratio sensor 41 has reached the upper limit air-fuel ratio leaner than the stoichiometric air-fuel ratio in the lean control, the degradation determination unit 72 determines that the promoter of the catalyst 20 is degraded. With this configuration, it is possible to detect not only degradation of the precious metal of the catalyst 20 but also degradation of the promoter of the catalyst 20.

Therefore, even when the oxidation capability of the catalyst 20 is not low, the target air-fuel ratio of inflow exhaust gas may be richer than the stoichiometric air-fuel ratio during the rich control because of a decrease in the oxygen storage capability of the catalyst 20. Usually, the degree of richness at this time is higher than the degree of richness when the oxidation capability of the catalyst 20 is low. For this reason, in the third embodiment, when the output air-fuel ratio of the downstream air-fuel ratio sensor 41 has reached the lower limit air-fuel ratio richer than the stoichiometric air-fuel ratio in the rich control, the degradation determination unit 72 determines that the promoter of the catalyst 20 is degraded. With this configuration, it is possible to detect not only degradation of the precious metal of the catalyst 20 but also degradation of the promoter of the catalyst 20.

Catalyst Degradation Determination Process

In the third embodiment, the control routine of the catalyst degradation determination process, shown in FIG. 8, is executed. In step S403 of FIG. 8, the lean-side determination process shown in FIG. 12 is executed, and, in step S405 of FIG. 8, the rich-side determination process shown in FIG. 13 is executed.

Figure 12:
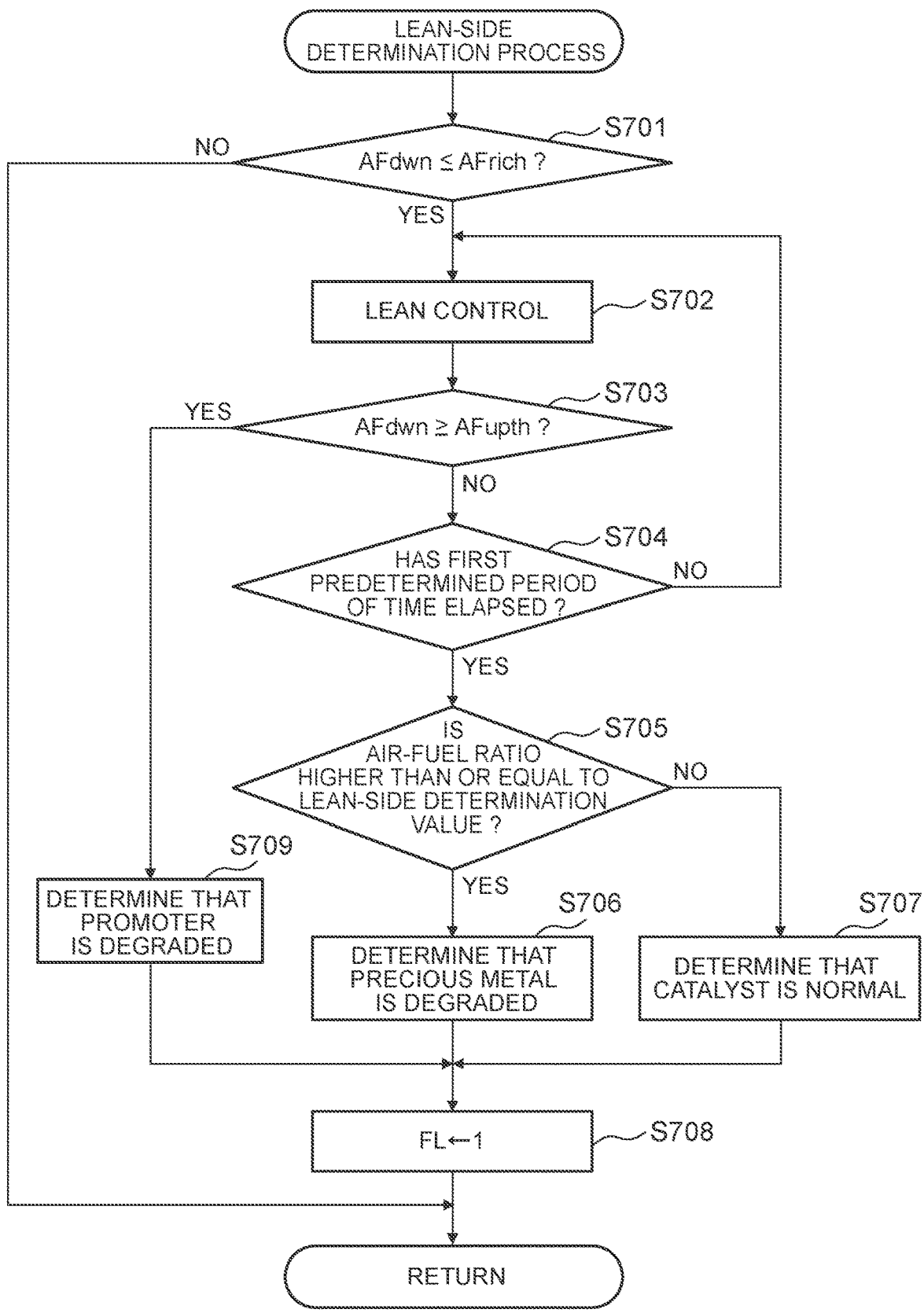
FIG. 12 is a flowchart that shows a control routine of a lean-side determination process in a third embodiment of the disclosure.
Figure 13:
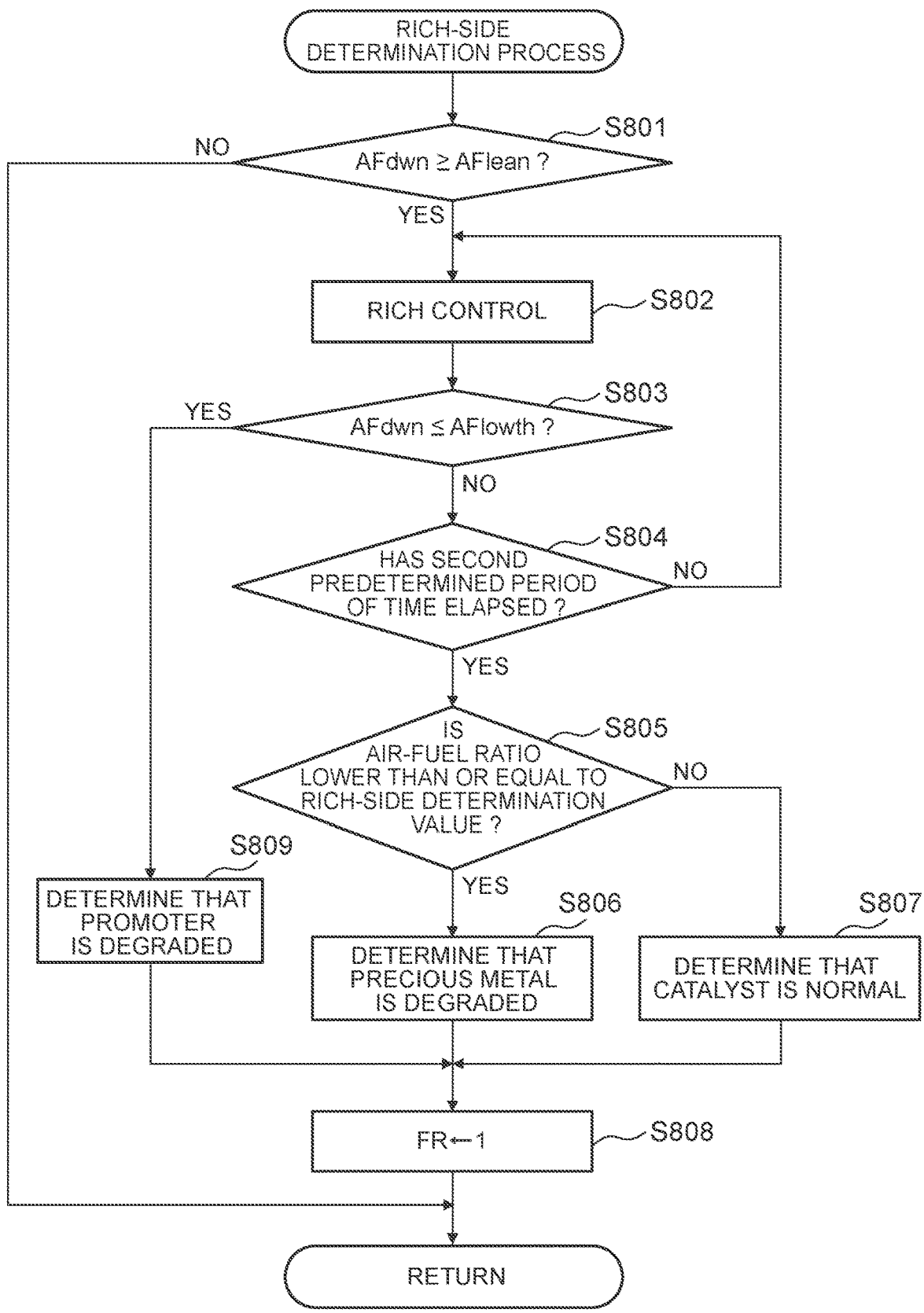
FIG. 13 is a flowchart that shows a control routine of a rich-side determination process in the third embodiment of the disclosure.

In the lean-side determination process shown in FIG. 12, initially, in step S701, the air-fuel ratio control unit 71 determines whether the output air-fuel ratio AFdwn of the downstream air-fuel ratio sensor 41 is lower than or equal to a rich determination air-fuel ratio AFrich richer than the stoichiometric air-fuel ratio. The rich determination air-fuel ratio AFrich is determined in advance and set to any value within the range of, for example, 14.4 to 14.55.

When the air-fuel ratio control unit 71 determines in step S701 that the output air-fuel ratio AFdwn of the downstream air-fuel ratio sensor 41 is leaner than the rich determination air-fuel ratio AFrich, the control routine proceeds to step S404 of FIG. 8. In this case, in the lean-side determination process, it is not determined whether the precious metal of the catalyst 20 is degraded.

On the other hand, when the air-fuel ratio control unit 71 determines in step S701 that the output air-fuel ratio AFdwn of the downstream air-fuel ratio sensor 41 is lower than or equal to the rich determination air-fuel ratio AFrich, the control routine proceeds to step S702. In step S702, as in the case of step S201 of FIG. 6, the air-fuel ratio control unit 71 executes lean control that brings the air-fuel ratio of inflow exhaust gas to an air-fuel ratio leaner than the stoichiometric air-fuel ratio.

Subsequently, in step S703, the air-fuel ratio control unit 71 determines whether the output air-fuel ratio AFdwn of the downstream air-fuel ratio sensor 41 is higher than or equal to the upper limit air-fuel ratio AFupth leaner than the stoichiometric air-fuel ratio. The upper limit air-fuel ratio AFupth is determined in advance and set to an air-fuel ratio leaner than the air-fuel ratio that is detected when the reduction capability is low while the oxygen storage amount of the catalyst 20 is increasing. In other words, the upper limit air-fuel ratio AFupth is set to a value leaner than a lean-side determination value that is used in step S705 (described later).

When the air-fuel ratio control unit 71 determines in step S703 that the output air-fuel ratio AFdwn of the downstream air-fuel ratio sensor 41 is richer than the upper limit air-fuel ratio AFupth, the control routine proceeds to step S704. In step S704, as in the case of step S202 of FIG. 6, the air-fuel ratio control unit 71 determines whether the first predetermined period of time has elapsed from when the lean control is started. When the air-fuel ratio control unit 71 determines that the first predetermined period of time has not elapsed, the control routine returns to step S702, the lean control is continued, and the determination of step S703 is performed again.

When the air-fuel ratio control unit 71 determines in step S703 that the output air-fuel ratio AFdwn of the downstream air-fuel ratio sensor 41 is higher than or equal to the upper limit air-fuel ratio AFupth, the air-fuel ratio control unit 71 terminates the lean control, and the control routine proceeds to step S709. In step S709, the degradation determination unit 72 determines that the promoter of the catalyst 20 is degraded. Specifically, the degradation determination unit 72 determines that the oxygen storage capability of the catalyst 20 is low because of degradation of the promoter of the catalyst 20. To inform a driver that the catalyst 20 is abnormal, the degradation determination unit 72 lights up an alarm lamp provided in the vehicle on which the internal combustion engine is mounted. The degradation determination unit 72 may cause the memory (ROM 34 or RAM 33) of the ECU 31 or another storage device to store a failure code associated with a low oxygen storage capability.

On the other hand, when the air-fuel ratio control unit 71 determines in step S704 that the first predetermined period of time has elapsed, the air-fuel ratio control unit 71 terminates the lean control, and the control routine proceeds to step S705. In step S705, as in the case of step S203 of FIG. 6, the degradation determination unit 72 determines whether the air-fuel ratio detected by the downstream air-fuel ratio sensor 41 while the oxygen storage amount of the catalyst 20 is increasing in the lean control is higher than or equal to the lean-side determination value.

When the degradation determination unit 72 determines in step S705 that the air-fuel ratio detected by the downstream air-fuel ratio sensor 41 is higher than or equal to the lean-side determination value, the control routine proceeds to step S706. In step S706, as in the case of step S204 of FIG. 6, the degradation determination unit 72 determines that the precious metal of the catalyst 20 is degraded.

On the other hand, when the degradation determination unit 72 determines in step S705 that the air-fuel ratio detected by the downstream air-fuel ratio sensor 41 is richer than the lean-side determination value, the control routine proceeds to step S707. In step S707, as in the case of step S205 of FIG. 6, the degradation determination unit 72 determines that the catalyst 20 is normal.

After step S706, step S707, or step S709, the control routine proceeds to step S708. In step S708, the degradation determination unit 72 sets the lean-side determination flag FL to one. After step S708, the control routine proceeds to step S404 of FIG. 8.

In the rich-side determination process shown in FIG. 13, initially, in step S801, the air-fuel ratio control unit 71 determines whether the output air-fuel ratio AFdwn of the downstream air-fuel ratio sensor 41 is higher than or equal to a lean determination air-fuel ratio AFlean leaner than the stoichiometric air-fuel ratio. The lean determination air-fuel ratio AFlean is determined in advance and set to any value within the range of, for example, 14.65 to 14.8.

When the air-fuel ratio control unit 71 determines in step S801 that the output air-fuel ratio AFdwn of the downstream air-fuel ratio sensor 41 is richer than the lean determination air-fuel ratio AFlean, the control routine ends. In this case, in the rich-side determination process, it is not determined whether the precious metal of the catalyst 20 is degraded.

On the other hand, when the air-fuel ratio control unit 71 determines in step S801 that the output air-fuel ratio AFdwn of the downstream air-fuel ratio sensor 41 is higher than or equal to the lean determination air-fuel ratio AFlean, the control routine proceeds to step S802. In step S802, as in the case of step S301 of FIG. 7, the air-fuel ratio control unit 71 executes rich control that brings the air-fuel ratio of inflow exhaust gas to an air-fuel ratio richer than the stoichiometric air-fuel ratio.

Subsequently, in step S803, the air-fuel ratio control unit 71 determines whether the output air-fuel ratio AFdwn of the downstream air-fuel ratio sensor 41 is lower than or equal to the lower limit air-fuel ratio AFlowth richer than the stoichiometric air-fuel ratio. The lower limit air-fuel ratio AFlowth is determined in advance and set to an air-fuel ratio richer than the air-fuel ratio that is detected when the oxidation capability is low while the oxygen storage amount of the catalyst 20 is reducing. In other words, the lower limit air-fuel ratio AFlowth is set to a value richer than a rich-side determination value that is used in step S805 (described later).

When the air-fuel ratio control unit 71 determines in step S803 that the output air-fuel ratio AFdwn of the downstream air-fuel ratio sensor 41 is leaner than the lower limit air-fuel ratio AFlowth, the control routine proceeds to step S804. In step S804, as in the case of step S302 of FIG. 7, the air-fuel ratio control unit 71 determines whether the second predetermined period of time has elapsed from when the rich control is started. When the air-fuel ratio control unit 71 determines that the second predetermined period of time has not elapsed, the control routine returns to step S802, the rich control is continued, and the determination of step S803 is performed again.

When the air-fuel ratio control unit 71 determines in step S803 that the output air-fuel ratio AFdwn of the downstream air-fuel ratio sensor 41 is lower than or equal to the lower limit air-fuel ratio AFlowth, the air-fuel ratio control unit 71 terminates the rich control, and the control routine proceeds to step S809. In step S809, the degradation determination unit 72 determines that the promoter of the catalyst 20 is degraded. Specifically, the degradation determination unit 72 determines that the oxygen storage capability of the catalyst 20 is low because of degradation of the promoter of the catalyst 20. To inform a driver that the catalyst 20 is abnormal, the degradation determination unit 72 lights up an alarm lamp provided in the vehicle on which the internal combustion engine is mounted. The degradation determination unit 72 may cause the memory (ROM 34 or RAM 33) of the ECU 31 or another storage device to store a failure code associated with a low oxygen storage capability.

On the other hand, when the air-fuel ratio control unit 71 determines in step S804 that the second predetermined period of time has elapsed, the air-fuel ratio control unit 71 terminates the rich control, and the control routine proceeds to step S805. In step S805, as in the case of step S303 of FIG. 7, the degradation determination unit 72 determines whether the air-fuel ratio detected by the downstream air-fuel ratio sensor 41 while the oxygen storage amount of the catalyst 20 is reducing in the rich control is lower than or equal to the rich-side determination value.

When the degradation determination unit 72 determines in step S805 that the air-fuel ratio detected by the downstream air-fuel ratio sensor 41 is lower than or equal to the rich-side determination value, the control routine proceeds to step S806. In step S806, as in the case of step S304 of FIG. 7, the degradation determination unit 72 determines that the precious metal of the catalyst 20 is degraded.

On the other hand, when the degradation determination unit 72 determines in step S805 that the air-fuel ratio detected by the downstream air-fuel ratio sensor 41 is leaner than the rich-side determination value, the control routine proceeds to step S807. In step S807, as in the case of step S305 of FIG. 7, the degradation determination unit 72 determines that the catalyst 20 is normal.

After step S806, step S807, or step S809, the control routine proceeds to step S808. In step S808, the degradation determination unit 72 sets the rich-side determination flag FR to one. After step S808, the control routine ends.

The control routines of FIG. 8, FIG. 12, and FIG. 13 may be modified as in the case of the control routines of FIG. 5 to FIG. 7. In step S701 of FIG. 12, the air-fuel ratio control unit 71 may bring the air-fuel ratio of inflow exhaust gas to an air-fuel ratio richer than the stoichiometric air-fuel ratio such that the output air-fuel ratio AFdwn of the downstream air-fuel ratio sensor 41 decreases to the rich determination air-fuel ratio AFrich. In step S801 of FIG. 13, the air-fuel ratio control unit 71 may bring the air-fuel ratio of inflow exhaust gas to an air-fuel ratio leaner than the stoichiometric air-fuel ratio such that the output air-fuel ratio AFdwn of the downstream air-fuel ratio sensor 41 increases to the lean determination air-fuel ratio AFlean.

Usually, when fuel cut control for stopping fuel injection by the fuel injection valves 11 is executed, the oxygen storage amount of the catalyst 20 reaches the maximum oxygen storage amount, and the output air-fuel ratio AFdwn of the downstream air-fuel ratio sensor 41 becomes leaner than the lean determination air-fuel ratio AFlean. For this reason, in step S801 of FIG. 13, the air-fuel ratio control unit 71 may determine whether fuel cut control is terminated.

In step S702 of FIG. 12, the air-fuel ratio control unit 71 may determine whether the slope of the output air-fuel ratio AFdwn of the downstream air-fuel ratio sensor 41 is greater than or equal to an upper limit. In other words, when the slope of the air-fuel ratio detected by the downstream air-fuel ratio sensor 41 is greater than or equal to the upper limit during the lean control, the degradation determination unit 72 may determine that the promoter of the catalyst 20 is degraded. The upper limit is determined in advance and set to a value greater than the slope of the air-fuel ratio that is detected when the reduction capability is low while the oxygen storage amount of the catalyst 20 is increasing.

In step S803 of FIG. 13, the air-fuel ratio control unit 71 may determine whether the slope of the output air-fuel ratio AFdwn of the downstream air-fuel ratio sensor 41 is less than or equal to a lower limit. In other words, when the slope of the air-fuel ratio detected by the downstream air-fuel ratio sensor 41 is less than or equal to the lower limit during the rich control, the degradation determination unit 72 may determine that the promoter of the catalyst 20 is degraded. The lower limit is determined in advance and set to a value less than the slope of the air-fuel ratio that is detected when the oxidation capability is low while the oxygen storage amount of the catalyst 20 is reducing.

Fourth Embodiment

A catalyst degradation detection apparatus according to a fourth embodiment is basically similar in configuration and control to the catalyst degradation detection apparatus according to the first embodiment except for the following points. Therefore, hereinafter, the fourth embodiment of the disclosure will be mainly described on portions different from the first embodiment.

Figure 14:
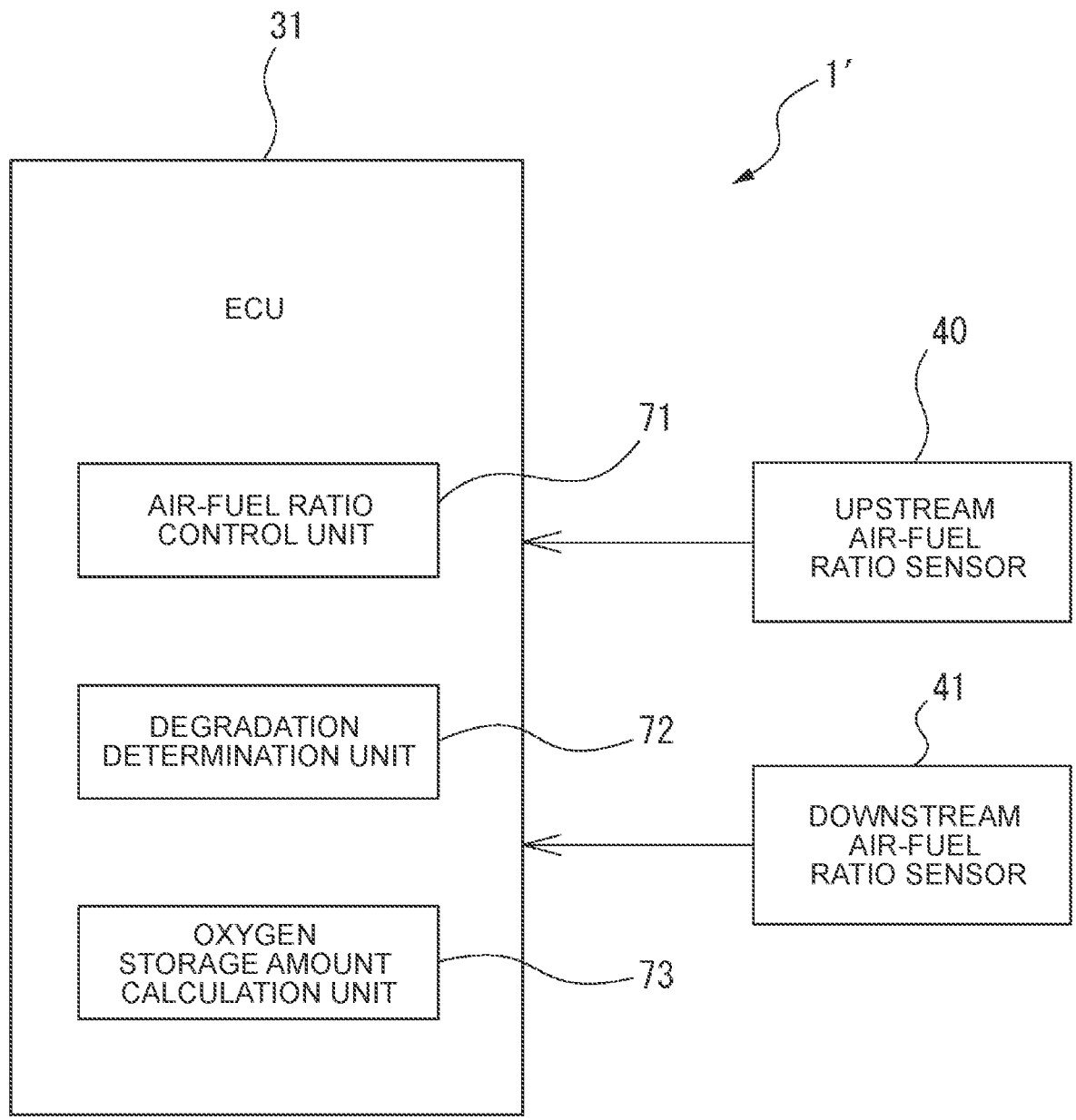
FIG. 14 is a block diagram that schematically shows the configuration of a catalyst degradation detection apparatus according to a fourth embodiment of the disclosure.

FIG. 14 is a block diagram that schematically shows the configuration of the catalyst degradation detection apparatus 1' according to the fourth embodiment of the disclosure. The catalyst degradation detection apparatus 1' includes the upstream air-fuel ratio sensor 40, the downstream air-fuel ratio sensor 41, the air-fuel ratio control unit 71, the degradation determination unit 72, and an oxygen storage amount calculation unit 73. The downstream air-fuel ratio sensor 41 is an example of the air-fuel ratio detector. In the present embodiment, the ECU 31 functions as the air-fuel ratio control unit 71, the degradation determination unit 72, and the oxygen storage amount calculation unit 73.

Figure 15:
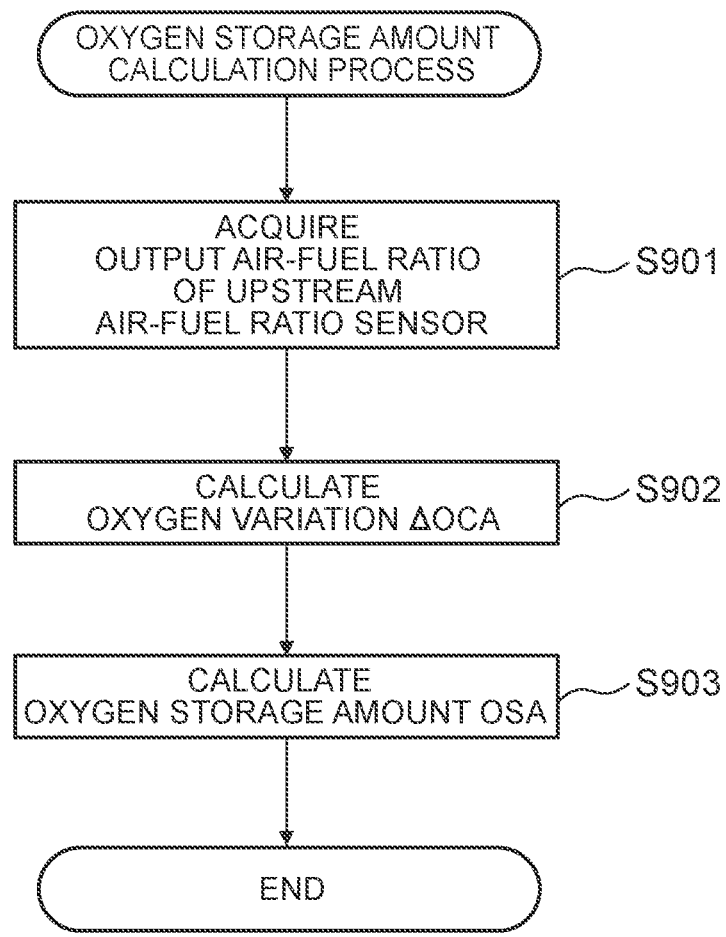
FIG. 15 is a flowchart that shows a control routine of an oxygen storage amount calculation process in the fourth embodiment.

The oxygen storage amount calculation unit 73 calculates the oxygen storage amount of the catalyst 20. FIG. 15 is a flowchart that shows a control routine of an oxygen storage amount calculation process in the fourth embodiment. The control routine is repeatedly executed by the ECU 31 after startup of the internal combustion engine.

Initially, in S901, the oxygen storage amount calculation unit 73 acquires the output air-fuel ratio of the upstream air-fuel ratio sensor 40.

Subsequently, in step S902, the oxygen storage amount calculation unit 73 calculates an oxygen variation AOCA in a minute period of time. The oxygen storage amount calculation unit 73 calculates the oxygen variation AOCA by using, for example, the following expression (1) based on the output air-fuel ratio of the upstream air-fuel ratio sensor 40 and the fuel injection amount. $AOCA = 0.23 \times (AFup - 14.6) \times Qi$ (1) where 0.23 is the oxygen concentration in air, 14.6 is the stoichiometric air-fuel ratio, Qi is a fuel injection amount in a minute period of time, and AFup is the output air-fuel ratio of the upstream air-fuel ratio sensor 40. The fuel injection amount Qi is calculated based on a command value issued from the ECU 31 to the fuel injection valves 11.

When the air-fuel ratio of inflow exhaust gas is leaner than the stoichiometric air-fuel ratio, oxygen is stored in the catalyst 20, and the value of the oxygen variation AOCA is positive. On the other hand, when the air-fuel ratio of inflow exhaust gas is richer than the stoichiometric air-fuel ratio, oxygen is released from the catalyst 20, and the value of the oxygen variation AOCA is negative.

Subsequently, in step S903, the air-fuel ratio control unit 71 calculates the oxygen storage amount OSA of the catalyst 20. Specifically, the air-fuel ratio control unit 71 calculates the oxygen storage amount OSA of the catalyst 20 by integrating the oxygen variation AOCA. After step S903, the control routine ends.

The oxygen storage amount calculation unit 73 may calculate an oxygen variation AOCA by using the following expression (2) based on the output air-fuel ratio of the upstream air-fuel ratio sensor 40 and the intake air volume. $AOCA = 0.23 \times (AFup - 14.6) \times Ga / AFup$ (2) where 0.23 is the oxygen concentration in air, 14.6 is the stoichiometric air-fuel ratio, Ga is an intake air volume in a minute period of time, and AFup is the output air-fuel ratio of the upstream air-fuel ratio sensor 40. The intake air volume Ga is calculated based on a signal output from the air flow meter 39.

In step S901, the target air-fuel ratio of inflow exhaust gas may be acquired, and the oxygen variation AOCA may be calculated based on the target air-fuel ratio TAF of inflow exhaust gas without using the output air-fuel ratio of the upstream air-fuel ratio sensor 40. In other words, in the expressions (1) and (2), the value of the target air-fuel ratio may be used instead of the output air-fuel ratio AFup of the upstream air-fuel ratio sensor 40. In this case, the upstream air-fuel ratio sensor 40 may be omitted from the catalyst degradation detection apparatus 1'.

In the fourth embodiment, the air-fuel ratio control unit 71 executes lean control such that the oxygen storage amount calculated by the oxygen storage amount calculation unit 73 does not reach the predetermined maximum oxygen storage amount. The maximum oxygen storage amount is set to, for example, the maximum oxygen storage amount of an unused (new) catalyst 20. With this configuration, it is possible to reduce a situation in which the oxygen storage amount of the catalyst 20 reaches the maximum oxygen storage amount during the lean control and, by extension, it is possible to increase the accuracy of detecting degradation of the precious metal of the catalyst 20.

The air-fuel ratio control unit 71 executes rich control such that the oxygen storage amount calculated by the oxygen storage amount calculation unit 73 does not reach zero. With this configuration, it is possible to reduce a situation in which the oxygen storage amount of the catalyst 20 reaches zero during the rich control and, by extension, it is possible to increase the accuracy of detecting degradation of the precious metal of the catalyst 20.

The air-fuel ratio control unit 71, for example, starts lean control when the oxygen storage amount calculated by the oxygen storage amount calculation unit 73 is less than or equal to a first switch reference value less than the maximum oxygen storage amount and starts rich control when the oxygen storage amount calculated by the oxygen storage amount calculation unit 73 is greater than or equal to a second switch reference value less than the maximum oxygen storage amount.

On the other hand, even when lean control is executed as described above, there are concerns that the oxygen storage amount of the catalyst 20 reaches the maximum oxygen storage amount during the lean control because of a decrease in the oxygen storage capability of the catalyst 20. Even when rich control is executed as described above, there are concerns that the oxygen storage amount of the catalyst 20 reaches zero during the rich control because of a decrease in the oxygen storage capability of the catalyst 20.

For this reason, as in the case of the third embodiment, when the output air-fuel ratio of the downstream air-fuel ratio sensor 41 has reached an upper limit air-fuel ratio leaner than the stoichiometric air-fuel ratio in the lean control or the output air-fuel ratio of the downstream air-fuel ratio sensor 41 has reached the lower limit air-fuel ratio richer than the stoichiometric air-fuel ratio in the rich control, the degradation determination unit 72 determines that the promoter of the catalyst 20 is degraded. With this configuration, it is possible to detect not only degradation of the precious metal of the catalyst 20 but also degradation of the promoter of the catalyst 20.

Catalyst Degradation Determination Process

In the third embodiment, the control routine of the catalyst degradation determination process, shown in FIG. 8, is executed. In step S403 of FIG. 8, the lean-side determination process shown in FIG. 16 is executed, and, in step S405 of FIG. 8, the rich-side determination process shown in FIG. 17 is executed.

Figure 16:
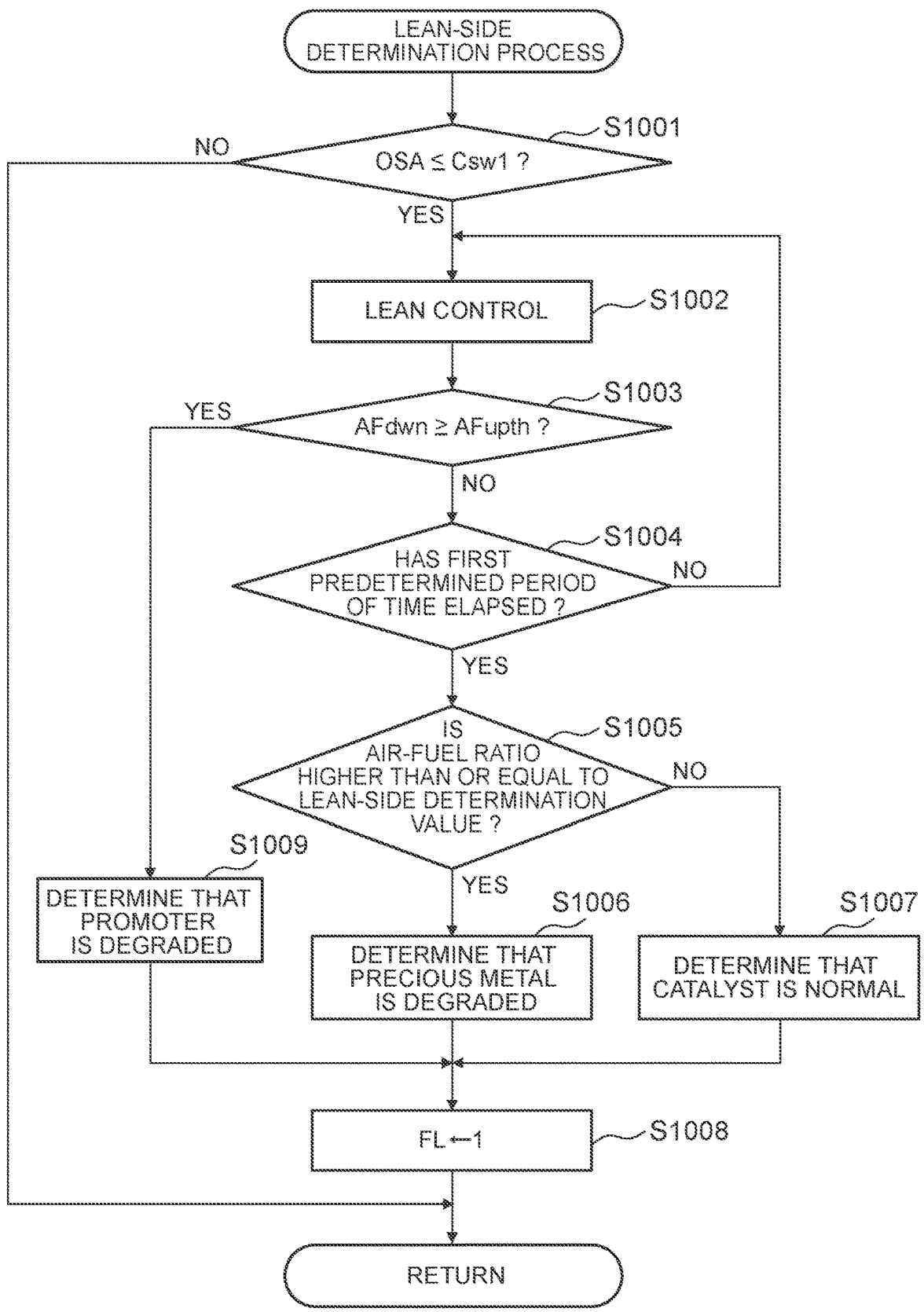
FIG. 16 is a flowchart that shows a control routine of a lean-side determination process in the fourth embodiment of the disclosure.

In the lean-side determination process shown in FIG. 16, initially, in step S1001, the air-fuel ratio control unit 71 determines whether the oxygen storage amount OSA calculated by the oxygen storage amount calculation unit 73 is less than or equal to the first switch reference value Csw1. The first switch reference value Csw1 is determined in advance and set to, for example, a value less than or equal to ⅔ of the maximum oxygen storage amount of an unused (new) catalyst 20.

In step S1001, the air-fuel ratio control unit 71 determines that the oxygen storage amount OSA is greater than the first switch reference value Csw1, the control routine proceeds to step S404 of FIG. 8. In this case, in the lean-side determination process, it is not determined whether the precious metal of the catalyst 20 is degraded.

On the other hand, when the air-fuel ratio control unit 71 determines in step S1001 that the oxygen storage amount OSA is less than or equal to the first switch reference value Csw1, the control routine proceeds to step S1002. Step S1002 to step S1009 are similar to step S702 to step S709 of FIG. 12 in the third embodiment, so the description thereof is omitted.

In the rich-side determination process shown in FIG. 17, initially, in step S1101, the air-fuel ratio control unit 71 determines whether the oxygen storage amount OSA calculated by the oxygen storage amount calculation unit 73 is greater than or equal to the second switch reference value Csw2. The second switch reference value Csw2 is determined in advance and set to, for example, a value greater than or equal to ⅓ of the maximum oxygen storage amount of an unused (new) catalyst 20.

In step S1101, when the air-fuel ratio control unit 71 determines that the oxygen storage amount OSA is less than the second switch reference value Csw2, the control routine ends. In this case, in the rich-side determination process, it is not determined whether the precious metal of the catalyst 20 is degraded.

On the other hand, when the air-fuel ratio control unit 71 determines in step S1101 that the oxygen storage amount OSA is greater than or equal to the second switch reference value Csw2, the control routine proceeds to step S1102. Step S1102 to step S1109 are similar to step S802 to step S809 of FIG. 13 in the third embodiment, so the description thereof is omitted.

The control routines of FIG. 8, FIG. 16, and FIG. 17 may be modified as in the case of the control routines of FIG. 5, FIG. 12, and FIG. 13.

As described above, some embodiments of the disclosure are described; however, the disclosure is not limited to these embodiments and encompasses various modifications and changes within the scope of the appended claims. Instead of the downstream air-fuel ratio sensor 41, for example, a NOx sensor capable of detecting the air-fuel ratio of exhaust gas may be used as the air-fuel ratio detector. The downstream catalyst 23 may be omitted from the internal combustion engine.

The target air-fuel ratio of inflow exhaust gas, which is set in lean control, may be changed during the lean control as long as the target air-fuel ratio is a value leaner than the stoichiometric air-fuel ratio. Similarly, the target air-fuel ratio of inflow exhaust gas, which is set in rich control, may be changed during the rich control as long as the target air-fuel ratio is a value richer than the stoichiometric air-fuel ratio.

The above-described embodiments may be implemented by any combination.

What is claimed is:

1. A catalyst degradation detection apparatus configured to detect degradation of a catalyst disposed in an exhaust passage of an internal combustion engine and capable of storing oxygen, the catalyst degradation detection apparatus comprising:
an air-fuel ratio detector disposed downstream of the catalyst and configured to detect an air-fuel ratio of exhaust gas flowing out from the catalyst; and
an electronic control unit configured to
control an air-fuel ratio of inflow exhaust gas flowing into the catalyst,
determine whether the catalyst is degraded,
execute degradation determination control that brings the air-fuel ratio of the inflow exhaust gas to an air-fuel ratio leaner or richer than a stoichiometric air-fuel ratio, and
determine whether precious metal of the catalyst is degraded based on the air-fuel ratio detected by the air-fuel ratio detector when an oxygen storage amount of the catalyst is varying in the degradation determination control, wherein:
the electronic control unit is configured to execute lean control that brings the air-fuel ratio of the inflow exhaust gas to an air-fuel ratio leaner than the stoichiometric air-fuel ratio as the degradation determination control; and
the electronic control unit is configured to, when the air-fuel ratio detected by the air-fuel ratio detector, an average of the air-fuel ratio, a variation in the air-fuel ratio, or a slope of the air-fuel ratio while the oxygen storage amount of the catalyst is increasing in the lean control is greater than or equal to a lean-side determination value, determine that the precious metal of the catalyst is degraded.

2. The catalyst degradation detection apparatus according to claim 1, wherein the electronic control unit is configured to start the lean control when the air-fuel ratio detected by the air-fuel ratio detector is lower than or equal to a rich determination air-fuel ratio richer than the stoichiometric air-fuel ratio.

3. The catalyst degradation detection apparatus according to claim 2, wherein the electronic control unit is configured to, when the air-fuel ratio detected by the air-fuel ratio detector reaches an upper limit air-fuel ratio leaner than the stoichiometric air-fuel ratio in the lean control, determine that a promoter of the catalyst is degraded.

4. The catalyst degradation detection apparatus according to claim 1, wherein:
the electronic control unit is configured to calculate the oxygen storage amount of the catalyst; and
the electronic control unit is configured to execute the lean control such that the calculated oxygen storage amount does not reach a predetermined maximum oxygen storage amount.

5. The catalyst degradation detection apparatus according to claim 4, wherein the electronic control unit is configured to, when the air-fuel ratio detected by the air-fuel ratio detector reaches an upper limit air-fuel ratio leaner than the stoichiometric air-fuel ratio in the lean control, determine that a promoter of the catalyst is degraded.

6. A catalyst degradation detection apparatus configured to detect degradation of a catalyst disposed in an exhaust passage of an internal combustion engine and capable of storing oxygen, the catalyst degradation detection apparatus comprising:
an air-fuel ratio detector disposed downstream of the catalyst and configured to detect an air-fuel ratio of exhaust gas flowing out from the catalyst; and
an electronic control unit configured to
control an air-fuel ratio of inflow exhaust gas flowing into the catalyst,
determine whether the catalyst is degraded,
execute degradation determination control that brings the air-fuel ratio of the inflow exhaust gas to an air-fuel ratio leaner or richer than a stoichiometric air-fuel ratio, and
determine whether precious metal of the catalyst is degraded based on the air-fuel ratio detected by the air-fuel ratio detector when an oxygen storage amount of the catalyst is varying in the degradation determination control, wherein:
the electronic control unit is configured to execute rich control that brings the air-fuel ratio of the inflow exhaust gas to an air-fuel ratio richer than the stoichiometric air-fuel ratio as the degradation determination control; and
the electronic control unit is configured to, when the air-fuel ratio detected by the air-fuel ratio detector, an average of the air-fuel ratio, a variation in the air-fuel ratio, or a slope of the air-fuel ratio while the oxygen storage amount of the catalyst is reducing in the rich control is less than or equal to a rich-side determination value, determine that the precious metal of the catalyst is degraded.

7. The catalyst degradation detection apparatus according to claim 6, wherein the electronic control unit is configured to start the rich control when the air-fuel ratio detected by the air-fuel ratio detector is higher than or equal to a lean determination air-fuel ratio leaner than the stoichiometric air-fuel ratio.

8. The catalyst degradation detection apparatus according to claim 7, wherein the electronic control unit is configured to, when the air-fuel ratio detected by the air-fuel ratio detector reaches a lower limit air-fuel ratio richer than the stoichiometric air-fuel ratio in the rich control, determine that a promoter of the catalyst is degraded.

9. The catalyst degradation detection apparatus according to claim 2, wherein:
the electronic control unit is configured to calculate the oxygen storage amount of the catalyst; and
the electronic control unit is configured to execute the rich control such that the calculated oxygen storage amount does not reach zero.

10. The catalyst degradation detection apparatus according to claim 9, wherein the electronic control unit is configured to, when the air-fuel ratio detected by the air-fuel ratio detector reaches a lower limit air-fuel ratio richer than the stoichiometric air-fuel ratio in the rich control, determine that a promoter of the catalyst is degraded.

11. A catalyst degradation detection apparatus configured to detect degradation of a catalyst disposed in an exhaust passage of an internal combustion engine and capable of storing oxygen, the catalyst degradation detection apparatus comprising:
an air-fuel ratio detector disposed downstream of the catalyst and configured to detect an air-fuel ratio of exhaust gas flowing out from the catalyst; and
an electronic control unit configured to
control an air-fuel ratio of inflow exhaust gas flowing into the catalyst, determine whether the catalyst is degraded,
execute degradation determination control that brings the air-fuel ratio of the inflow exhaust gas to an air-fuel ratio leaner or richer than a stoichiometric air-fuel ratio, and determine whether precious metal of the catalyst is degraded based on the air-fuel ratio detected by the air-fuel ratio detector when an oxygen storage amount of the catalyst is varying in the degradation determination control, wherein:
the electronic control unit is configured to execute lean control that brings the air-fuel ratio of the inflow exhaust gas to an air-fuel ratio leaner than the stoichiometric air-fuel ratio and rich control that brings the air-fuel ratio of the inflow exhaust gas to an air-fuel ratio richer than the stoichiometric air-fuel ratio as the degradation determination control;
the electronic control unit is configured to, when the air-fuel ratio detected by the air-fuel ratio detector, an average of the air-fuel ratio, a variation in the air-fuel ratio, or a slope of the air-fuel ratio while the oxygen storage amount of the catalyst is increasing in the lean control is greater than or equal to a lean-side determination value, determine that the precious metal of the catalyst is degraded; and
the electronic control unit is configured to, when the air-fuel ratio detected by the air-fuel ratio detector, an average of the air-fuel ratio, a variation in the air-fuel ratio, or a slope of the air-fuel ratio while the oxygen storage amount of the catalyst is reducing in the rich control is less than or equal to a rich-side determination value, determine that the precious metal of the catalyst is degraded.

12. The catalyst degradation detection apparatus according to claim 11, wherein the electronic control unit is configured to successively execute the lean control and the rich control.

13. The catalyst degradation detection apparatus according to claim 11, wherein the electronic control unit is configured to start the lean control when the air-fuel ratio detected by the air-fuel ratio detector is lower than or equal to a rich determination air-fuel ratio richer than the stoichiometric air-fuel ratio.

14. The catalyst degradation detection apparatus according to claim 13, wherein the electronic control unit is configured to, when the air-fuel ratio detected by the air-fuel ratio detector reaches an upper limit air-fuel ratio leaner than the stoichiometric air-fuel ratio in the lean control, determine that a promoter of the catalyst is degraded.

15. The catalyst degradation detection apparatus according to claim 11, wherein:
the electronic control unit is configured to calculate the oxygen storage amount of the catalyst; and
the electronic control unit is configured to execute the lean control such that the calculated oxygen storage amount does not reach a predetermined maximum oxygen storage amount.

16. The catalyst degradation detection apparatus according to claim 15, wherein the electronic control unit is configured to, when the air-fuel ratio detected by the air-fuel ratio detector reaches an upper limit air-fuel ratio leaner than the stoichiometric air-fuel ratio in the lean control, determine that a promoter of the catalyst is degraded.

17. The catalyst degradation detection apparatus according to claim 11, wherein the electronic control unit is configured to start the rich control when the air-fuel ratio detected by the air-fuel ratio detector is higher than or equal to a lean determination air-fuel ratio leaner than the stoichiometric air-fuel ratio.

18. The catalyst degradation detection apparatus according to claim 17, wherein the electronic control unit is configured to, when the air-fuel ratio detected by the air-fuel ratio detector reaches a lower limit air-fuel ratio richer than the stoichiometric air-fuel ratio in the rich control, determine that a promoter of the catalyst is degraded.

19. The catalyst degradation detection apparatus according to claim 11, wherein:
the electronic control unit is configured to calculate the oxygen storage amount of the catalyst; and
the electronic control unit is configured to execute the rich control such that the calculated oxygen storage amount does not reach zero.

20. The catalyst degradation detection apparatus according to claim 19, wherein the electronic control unit is configured to, when the air-fuel ratio detected by the air-fuel ratio detector reaches a lower limit air-fuel ratio richer than the stoichiometric air-fuel ratio in the rich control, determine that a promoter of the catalyst is degraded.

21. The catalyst degradation detection apparatus according to claim 1, wherein the electronic control unit is configured to, when a difference between the air-fuel ratio detected by the air-fuel ratio detector and the stoichiometric air-fuel ratio reaches an upper limit in the degradation determination control, not determine whether the precious metal of the catalyst is degraded.

* * * * *